US012600176B2

(12) United States Patent  (10) Patent No.: US 12,600,176 B2
Maeda et al.  (45) Date of Patent: Apr. 14, 2026

(54) HYDROPHOBIC PATTERNS FOR TIRE TREAD GROOVES

(71) Applicant: Bridgestone Europe NV/SA [BE/BE], Zaventem (BE)

(72) Inventors: Shimpei Maeda, Tokyo (JP); Pasquale Agoretti, Zaventem (BE); Giuseppe Rodriquez, Zaventem (BE)

(73) Assignee: Bridgestone Europe, NV/SA, Zaventem (BE)

( * ) Notice: Subject to any disclaimer, the term of this patent is extended or adjusted under 35 U.S.C. 154(b) by 38 days.

(21) Appl. No.: 18/270,883

(22) PCT Filed: Dec. 23, 2021

(86) PCT No.: PCT/EP2021/087575
    § 371 (c)(1),
    (2) Date: Jul. 5, 2023

(87) PCT Pub. No.: WO2022/148674
    PCT Pub. Date: Jul. 14, 2022

(65) Prior Publication Data
    US 2024/0051348 A1  Feb. 15, 2024

(30) Foreign Application Priority Data
    Jan. 5, 2021  (EP) .................................... 21150347

(51) Int. Cl.
    *B60C 11/13*  (2006.01)
    *B60C 11/03*  (2006.01)
(52) U.S. Cl.
    CPC ...... *B60C 11/1353* (2013.01); *B60C 11/1307* (2013.01); *B60C 2011/0341* (2013.01);
    (Continued)

(58) Field of Classification Search
    CPC . B60C 11/13; B60C 11/1353; B60C 11/1307; B60C 2011/1361; B60C 2011/1338
    See application file for complete search history.

(56) References Cited

U.S. PATENT DOCUMENTS

| 9,238,309 B2 | 1/2016 | King et al. |
| 2009/0218018 A1 | 9/2009 | Ikeda |
(Continued)

FOREIGN PATENT DOCUMENTS

| EP | 3760425 A1 | 1/2021 |
| JP | 2004181980 A * | 7/2004 |
(Continued)

OTHER PUBLICATIONS

Japan Patent Office, Japanese Office Action for Application No. 2023-541081, dated Jan. 20, 2026, 3 pages.

*Primary Examiner* — Cedrick S Williams
(74) *Attorney, Agent, or Firm* — Patterson Intellectual Property Law, PC

(57) ABSTRACT

A tread for a pneumatic tyre, the tread comprising a plurality of grooves, the grooves comprising: a groove surface (122); and a plurality of elements (410) spaced from one another in an arrangement on the groove surface (122). Each element (410) has a shape defining a volume, the shape including: a first cross-sectional shape (425) in a plane (420) parallel to the groove surface (122); and a second cross-sectional shape (435) in a plane (430) perpendicular to the groove surface (122). The arrangement comprises a void volume in the spaces between the elements (410) and a void ratio of between 0.5 to 0.75, wherein the void ratio is defined as a ratio of the void volume to the total volume of the elements (410) in the arrangement.

13 Claims, 19 Drawing Sheets

(52) U.S. Cl.
CPC ................. *B60C 2011/1338* (2013.01); *B60C 2011/1361* (2013.01)

(56)                      References Cited

U.S. PATENT DOCUMENTS

| 2016/0318353 A1* | 11/2016 | Byrne ................. B60C 11/1307 |
| 2016/0332491 A1* | 11/2016 | Shmagranoff ...... B60C 11/1353 |
| 2017/0066292 A1 | 3/2017 | Cambon et al. |
| 2017/0225519 A1* | 8/2017 | Lutz ........................ B60C 11/24 |
| 2018/0162174 A1 | 6/2018 | Wieland et al. |
| 2021/0001669 A1* | 1/2021 | Matsumoto ......... B60C 11/1307 |

FOREIGN PATENT DOCUMENTS

| JP | 2010179895 A | * | 8/2010 |
| JP | 2012517909 A | | 8/2012 |
| JP | 2013169827 A1 | | 9/2013 |
| JP | 2017507076 A | | 3/2017 |
| WO | 2010096072 A1 | | 8/2010 |
| WO | 2013122232 A1 | | 8/2013 |
| WO | 2020241491 A1 | | 12/2020 |

* cited by examiner

A)

B)

A)

410c

122

S

B)

S

W'

W

425c

C)

435c

W'

W h

S

D)

0.6 mm

C = 0.95

0.15 mm

HYDROPHOBIC PATTERNS FOR TIRE TREAD GROOVES

TECHNICAL FIELD

The present invention relates to hydrophobic patterns for tire tread grooves, resulting in a tread having increased drainage capability.

BACKGROUND

Part of the research in the field of pneumatic tires is concentrated on obtaining treads that have improved performance in terms of wet grip.

As is known to a person skilled in the art, the grip of the tread on the road surface under wet conditions is a function of the capability of the tread itself to remove the layer of water which forms between the road surface and the tread. This layer of water necessarily compromises the effective grip of the tread on the road surface. To facilitate the removal of the layer of water, the treads are provided with grooves. In fact, by means of the grooves of the tread, a drainage step is implemented.

In this regard, it is important to explain how the performance under wet conditions of a pneumatic tire provides for a first drainage step, wherein the layer of water located between the tread and the road surface is removed from the tread, and a contact step, wherein the blocks of the tread adhere to the road surface. The shorter the drainage step and the more water that is removed, the more efficient the wet gripping.

As is known, a solution for rendering the drainage step shorter and also for increasing the quantity of water that is drained, is that of increasing the volume of the grooves within the tread. This solution, although it succeeds in rendering the drainage step shorter and more effective, nevertheless causes the contact surface between the tread and the road surface to be reduced to the detriment of the contact step itself and, therefore, of the braking and steering action. Furthermore, it is known that an increase in the volume of the grooves can negatively influence the wear resistance of the tread.

It has been known in the tire industry that particular surface textures of the grooves of the tread can favour a more rapid evacuation of the water. Such a solution has the great advantage of intervening only upon the groove surface and not upon the number and/or upon the dimensions of the grooves, therefore without reducing the contact surface between the tread itself and the road surface.

There remains a need to improve the groove surface of tire treads so as to impart better hydrophobic characteristics to enhance water drainage.

STATEMENTS OF INVENTION

According to a first aspect of the present invention there is provided a tread for a pneumatic tire, the tread comprising:

a plurality of grooves, the grooves comprising:
  a groove surface; and
  a plurality of elements spaced from one another in an arrangement on the groove surface;
  wherein each element has a shape defining a volume, the shape including:
    a first cross-sectional shape in a plane parallel to the groove surface, wherein a smallest dimension of the first cross-sectional shape defined at the groove surface defines the width w of a base of the element, wherein 0.1 mm≤w≤3 mm;
    a second cross-sectional shape in a plane perpendicular to the groove surface, wherein a greatest dimension of the second cross-sectional shape from the base at the groove surface to a top defines the height h of the element, wherein 0.1 mm≤h≤3 mm; and
    an aspect ratio of the height h divided by the width w of at least 1 and up to 30;
  and wherein the arrangement comprises:
    a void volume in the spaces between the elements; and
    a void ratio of between 0.5 to 0.75, wherein the void ratio is defined as a ratio of the void volume to the total volume of the elements in the arrangement.

The inventors have appreciated that by arranging spaced apart elements on at least one of the surfaces of the grooves of a tread in a pneumatic tire, it is possible to change the physical properties of the groove surface. In particular it is possible to alter the hydrophobic characteristics of the groove surface by the incorporation of elements on the groove surface.

Within the meaning of the present invention, the hydrophobic characteristics of a surface correspond to the contact angle formed by a static droplet of water when bought into contact with said surface. Thus, a contact angle of greater than 90° would correspond to a surface with hydrophobic characteristics, and a contact angle of less than 90° would correspond to a surface with hydrophilic characteristics.

It will be understood that the spaces between the elements are defined by the three-dimensional space available between the elements in the arrangement, i.e. between the plane of the groove surface and a plane across the tops of the elements (these two planes being separated by the height h). The elements may be considered as protrusions from the groove surface even when they have been created by removing material from an initial groove surface i.e. to lower the groove surface. The groove surface is the lowermost surface within the grooves when viewed externally of the tread. The void volume may therefore be considered as a negative of the total volume of the elements. In other words, the void volume is defined by the total available area between the elements multiplied by their height h. The void volume can be defined regardless of whether the elements are formed by adding or removing material to/from an initial groove surface.

It will be appreciated that the void ratio is defined as the ratio of the total void volume to the total volume of the elements in the arrangement, e.g. the total void volume divided by the total element volume in any given overall volume of the arrangement on the groove surface. For example, if the void ratio is 0.5 then the volume of the elements is twice the void volume within the arrangement. As the void ratio increases, the total void volume increases and the space between adjacent elements increases, which is expected to increase the contact angle provided by the elements at least when the arrangement is newly formed. However, it has been found beneficial to limit the void ratio to 0.75, so that the relative volume of the elements remains larger than the void volume. The inventors have realised that the volume of the elements is important for their durability and increasing their volume provides resistance to ageing, where erosion of the elements over time otherwise tends to reduce the hydrophobic characteristics of the groove surface. Thus the void ratio is selected to be between 0.5 and 0.75 as this has been found to provide a balance between good hydrophobic behaviour when the arrangement is newly formed and resistance to ageing over the lifetime of a tread. In some preferred embodiments, the void ratio is selected to be e.g. between 0.55 and 0.75, e.g. between 0.6 and 0.75, e.g. between 0.65 and 0.75, e.g. between 0.7 and 0.75, e.g. between 0.5 and 0.7, e.g. between 0.5 and 0.65, e.g. between 0.5 and 0.6, e.g. between 0.5 and 0.55.

The plurality of elements being arranged on the groove surface means that they are physically distinct from the groove surface, whether e.g. protruding from the surface or created by being embossed into the surface. The effect of the elements being on the groove surface is to modify the hydrophobic characteristics of the surface. In some embodiments, the plurality of elements are arranged on at least two, e.g. at least three, of a plurality of groove surfaces. In some embodiments the plurality of elements are arranged on substantially all of the groove surface, e.g. the groove surface is completely covered with the elements. In preferred embodiments the elements are protruding from the groove surface. Preferably the elements are spaced from one another in an arrangement of protruding elements on the groove surface.

It will be appreciated that a groove may have one or more groove surfaces. For example, a groove may have a base surface and two side wall surfaces such that the groove substantially has a U-shaped cross-section in a plane perpendicular to the surface of the tire tread. However, it will be appreciated that a groove may have any suitable and/or desirable cross-section and thus comprise any suitable and/ or desirable number of surfaces. In some embodiments, the groove may comprise only straight surfaces, e.g. having a polygonal cross-section. In some embodiments, the groove may comprise a curved surface, e.g. a semi-circular cross-section. In some embodiment the groove may comprise any suitable and/or desirable combination of curved and/or straight surfaces, e.g. a bullet shape with straight sided surfaces and a curved (e.g. dome shaped) base surface.

It will be appreciated that the hydrophobic characteristics of the groove surface may be directly affected by one or more of the element size (e.g. element volume), element shape (e.g. the first and second cross-sectional shapes, the aspect ratio), and the space between adjacent elements (e.g. void volume). The void ratio may therefore be considered a key parameter of interest as it links the volume of the elements to the void volume defined by the spaces between the elements.

In some embodiments, the second cross-sectional shape may be any suitable and/or desirable shape. The overall shape of the elements may, for example, be generally cylindrical, conical, cubic, cuboid, polygonal, pyramidal, parabolic or hyperbolic. In a set of embodiments the second cross-sectional shape is square or rectangular. Thus the element may have the overall shape of a cylinder or triangular prism.

According to a second aspect of the present invention there is provided a tread for a pneumatic tire, the tread comprising a plurality of grooves, the grooves comprising:
    a groove surface; and
    a plurality of elements spaced from one another in an arrangement on the groove surface;
    wherein each element has the shape of a cylinder or triangular prism defining a volume; and
    wherein the arrangement comprises:
    a void volume in the spaces between the elements; and
    a void ratio of between 0.5 to 0.75, wherein the void ratio is defined as a ratio of the void volume to the total volume of the elements in the arrangement.

In embodiments of this second aspect, the arrangement on the groove surface comprises a plurality of elements in the form of cylinders and/or triangular prisms. In this way, it has been confirmed that the contact angle between a drop of water and the surface is increased to the point of ensuring a shorter drainage step. In fact, as is known to a person skilled in the art, the greater the contact angle between the drop of water and the surface, the greater will be the tendency of the water to evacuate the surface and, therefore, the shorter the drainage step will be.

At least some embodiments according to this second aspect may also include one or more of the features of the first aspect. In some embodiments according to this second aspect, the shape of a cylinder or triangular prism includes a first cross-sectional shape in a plane parallel to the groove surface, wherein a smallest dimension of the first cross-sectional shape defined at the groove surface defines the width w of the element, wherein 0.1 mm w 3 mm. In some embodiments according to this second aspect, the shape of a cylinder or triangular prism includes a second cross-sectional shape in a plane perpendicular to the groove surface, wherein a greatest dimension of the second cross-sectional shape from the groove surface defines the height h of the element, wherein 0.1 mm h 3 mm. In some embodiments according to this second aspect, the shape of a cylinder or triangular prism includes an aspect ratio of the height h divided by the width w of at least 1 and up to 30.

The inventors have found that, in general, as the volume of an element increases, the surface area of the top of an element increases and the contact angle (e.g. of the groove surface comprising the elements) decreases such that the apparent groove surface becomes less hydrophobic when the elements are newly formed. Thus, it may be considered that minimising the volume of the elements would result in a greater contact angle and thus a tread with improved hydrophobic characteristics. Reducing the volume of the elements would also tend to increase the space between elements and hence increase the void ratio.

However, the inventors have also appreciated that the hydrophobic characteristics imparted to a groove surface by the elements can change as the elements suffer from erosion with the aging of a tire tread, e.g. through use of a tire on a road. The inventors have found that it is beneficial to limit the void ratio so that the volume of the elements is not too small relative to the void volume. Larger volume elements have been found, in general, to suffer less of a change in the contact angle over time.

The inventors have thus appreciated that, the smaller the volume of an element, the less resistant to aging the element will be and thus the more quickly the element will erode and the hydrophobic characteristics imparted by the elements may be affected. However it may not be straightforward to predict how aging will affect the geometry of the elements and hence the hydrophobic characteristics of the groove surface. The inventors have appreciated that a compromise can be reached between maximising the volume of the elements to provide improved aging resistance and minimising the surface area of the top of the protrusion.

In some embodiments of the first aspect, the second cross-sectional shape may be any suitable and/or desirable shape. However, the inventors have surprisingly found that a compromise may be found by selecting the elements to have a second cross-sectional shape which has a wider dimension at the base (e.g. adjacent to the groove surface) than at the top (e.g. the surface which will be in contact with water). By making the element wider at the base, the inventors have found that the element volume may be increased without negatively impacting on the surface hydrophobic characteristics, e.g. by reducing the surface area at the top of the element. As such, the inventors have surprisingly found it to be desirable to configure the element to have a second cross-sectional shape which is not rectangular such that the elements are non-pillar structures (e.g. not element shapes comprising a constant width from the base to the top of the element). Such elements do not have a cylindrical or triangular prism shape.

Each element has a shape that may include more than one second cross-sectional shape in a plane perpendicular to the groove surface, for example if the first cross-sectional shape has both a width and a length. The second cross-sectional shape of most interest for the hydrophobic characteristics of the groove surface is the second cross-sectional shape that includes the smallest dimension defined at the groove surface i.e. the second cross-sectional shape that includes the width w of the element at its base. Thus, in preferred embodiments, the second cross-sectional shape includes the width w and the height h, wherein the width w at the base of the second cross-sectional shape is greater than a corresponding width w' at the top of the second cross-sectional shape. In other words, the second cross-sectional shape is tapered from its base (at the groove surface) to its top surface (farthest from the groove surface). Preferably the second cross-sectional shape is selected to not be a rectangle or square.

This is considered novel and inventive in its own right. Thus, when viewed from a third aspect, the present invention provides a tread for a pneumatic tire, the tread comprising a plurality of grooves, the grooves comprising:

a groove surface; and
a plurality of elements spaced from one another in an arrangement on the groove surface;
wherein each element has a shape including:
a first cross-sectional shape in a plane parallel to the groove surface, wherein a smallest dimension of the first cross-sectional shape defined at the groove surface defines the width w of a base of the element;
a second cross-sectional shape in a plane perpendicular to the groove surface, wherein a greatest dimension of the second cross-sectional shape from the base at the groove surface to a top defines the height h of the element;
wherein the second cross-sectional shape includes the width w and the height h, wherein the width w at the base of the second cross-sectional shape is greater than a corresponding width w' at the top of the second cross-sectional shape.

By making the elements wider at the base, their volume can be increased without negatively impacting on the surface hydrophobic characteristics provided by the top of the second cross-sectional shape. The inventors have found that such elements demonstrate improved resistance to ageing. Thus, an arrangement of elements having a second cross-sectional shape having a wide base has been advantageously found by the inventors to allow a good compromise between maximising the element volume to improve resistance to aging, and minimising the contact area between the elements and a static water droplet. It will be understood that the corresponding width w' at the top of the second cross-sectional shape is one that is measured in the same orientation as the width w at the base.

At least some embodiments according to this third aspect may also include one or more of the features of the first aspect. In some embodiments according to this third aspect, the shape of each element defines a volume and wherein the arrangement comprises: a void volume in the spaces between the elements; and a void ratio of between 0.5 to 0.75, wherein the void ratio is defined as a ratio of the void volume to the total volume of the elements in the arrangement. In some embodiments according to this third aspect, the width w of the element is selected to be 0.1 mm≤w≤3 mm. In some embodiments according to this third aspect, the height h of the element is selected to be 0.1 mm≤h≤3 mm. In some embodiments according to this third aspect, the shape includes an aspect ratio of the height h divided by the width w of at least 1 and up to 30.

Furthermore, the inventors have found that the contact angle of a static water drop increases when the elements have a greater degree of curvature on the top surface (e.g. the surface in contact with the water droplet). Thus, for example, the inventors have discovered that the contact angle formed between a static water droplet and a groove comprising an arrangement of pillar-shaped elements (e.g. comprising a rectangular second cross-sectional shape) is less than (e.g. less hydrophobic than) the contact angle formed between a static water droplet and an arrangement of elements comprising a second cross-sectional shape which has a curved, filleted, rounded or chamfered top. This effect is further observed as the radius of curvature of the fillet (e.g. the extent of rounding of the top) is increased or the gradient of the slope (e.g. of the chamfer or curve) is decreased (e.g. as the rounding increases or the slope gradient decreases, the contact angle formed between a static water droplet and the elements increases, e.g. becomes more hydrophobic).

In some embodiments, the second cross-sectional shape is generally tapered from its base to its top, e.g. with straight sides. For example, the second cross-sectional shape may generally be a triangle, truncated triangle or trapezoid. However, the inventors have further found it beneficial to avoid corners between the sides and top of the second cross-sectional shape. As mentioned above, in some preferred embodiments the second cross-sectional shape includes a curved, filleted, rounded or chamfered top. In at least some embodiments the second cross-sectional shape is tapered from its base to its top, including sides extending from the base to the top and a curved or angled transition between the sides and the top, wherein the top is flat. The sides may extend from the base to the top at an angle of about 90° (e.g. a pillar shape with a filleted or chamfered top) or at an interior angle of between 25° and 85° (e.g. a triangular shape with a truncated top). The sides may be straight or curved.

In some preferred embodiments, the second cross-sectional shape may generally be a semi-circle, parabola, hyperbola or half oval. In some embodiments, the second cross-sectional shape is generally parabolic or hyperbolic (for example, the elements are paraboloid or hyperboloid in their overall shape e.g. a continuous curved structure truncated at the base).

In some embodiments, the second cross-sectional shape is a polygonal shape, preferably flattened or rounded at the top (e.g. to create a gradual transition from the sides of the shape to the top). In some embodiments, the second cross-sectional shape is a four-sided polygon, e.g. a square or rectangle with four internal angles greater than 90° and two internal angles equal to or less than 90° (e.g. preferably wherein the two angles that are equal to or less than 90° are at the base of the cross-section adjacent to the groove surface), e.g. a trapezoid. In some embodiments, the second cross-sectional shape is a rounded trapezoid. In some embodiments, the second cross-sectional shape is a six-sided polygon, e.g. a square or rectangle with a chamfered edge cutaway at the top surface of the element. In some embodiments, the second cross-sectional shape comprises a curved edge which transitions from the side to the top, e.g. a square or rectangle with a filleted cutaway at the top, e.g. to create a gradual transition from the sides to the top surface of the element. In some embodiments, the second cross-sectional shape is a truncated or flattened hyperbola, e.g. a hyperbolic shape comprising a flat top, e.g. truncated at the narrowest part such that the base of the cross-section has a greater width that the top of the cross-section. In some embodiments, the second cross-sectional shape is a truncated or flattened parabola, e.g. a parabolic shape comprising a flat top. In some embodiments the second cross-sectional shape may comprise at least one straight edge and at least one curved edge.

Preferably, the top of the second cross-sectional shape comprises a flat top without sharp corners, e.g. the top comprises a curved side or rounded edge such that the three dimensional element comprises a rounded shape that transitions from the flat element top surface to the side surfaces. For example, in some embodiments the flat surface top may transition to the base of the shape via a sinusoidal or conical function such that the base of the element has a width that is greater than the top of the element.

In some embodiments the second cross-sectional shape is in a plane perpendicular to the groove surface and perpendicular to the circumferential direction. In some embodiments the second cross-sectional shape is in a plane perpendicular to the groove surface and parallel to the circumferential direction.

In some embodiments, the height h is at least 0.2 mm, 0.3 mm, 0.4 mm, 0.5 mm, 0.6 mm, 0.7 mm, 0.8 mm, or 0.9 mm. In some embodiments, the height h is up to 0.5 mm, 0.6 mm, 0.7 mm, 0.8 mm, 0.9 mm or 1 mm. In some embodiments, the height h is between 0.1 mm and 1 mm. In some other embodiments, the height h is up to 1.5 mm, 2 mm, 2.5 mm or 3 mm.

In some embodiments, the aspect ratio of the elements is greater than 1, e.g. the second cross-sectional shape has a height, h, that is greater than the width, w, of the first cross-sectional shape. In preferable embodiments, the aspect ratio of the elements is substantially greater than 1, e.g. the ratio of height, h, to width, w, is at least 1.5, 2, 3, or 4.

Each element includes a first cross-sectional shape in a plane parallel to the groove surface. In some embodiments, the first cross-sectional shape may be any suitable and/or desirable geometric shape. For example, the first cross-sectional shape may be a square, a circle, an oval, a rectangle, a triangle, a polygon, a mathematical symbol, an algebraic symbol, an irregular polygon, e.g. a polyomino, e.g. a tetromino, e.g. a pentomino. It will be appreciated that the first cross-sectional shape may be chosen or varied independently of the second cross-sectional shape, resulting in a wide variety of different three-dimensional shapes being possible for the elements.

In some embodiments, the width w is at least 0.2 mm, 0.3 mm, 0.4 mm, 0.5 mm, 0.6 mm, 0.7 mm, 0.8 mm, or 0.9 mm. In some embodiments, the width w is up to 0.5 mm, 0.6 mm, 0.7 mm, 0.8 mm, 0.9 mm or 1 mm. In some embodiments, the width w is between 0.1 mm and 1 mm. In some other embodiments, the width w is up to 1.5 mm, 2 mm, 2.5 mm or 3 mm.

In some embodiments, the first cross-sectional shape may have a generally constant width, e.g. point-like elements. In some other embodiments, the first cross-sectional shape may have a length l that is greater than the width w. For example, first cross-sectional shape may be an extended rectangle (optionally with a curved, filleted, rounded or chamfered top). More generally, in some embodiments the first cross-sectional shape is an elongate strip defining a length l much greater than the width w. In some embodiments, the length l is at least 1 mm, 2 mm, 3 mm, 4 mm, or mm. In some embodiments, the length l is up to 5 mm, 10 mm, 15 mm or 20 mm. In some embodiments, the length l is up to 30 mm, 40 mm, 50 mm, 60 mm, 70 mm, 80 mm, 90 mm or 100 mm. In some embodiments, the length l is between 1 mm and 100 mm.

In some embodiments, the elongate strip may extend along the circumferential direction of the groove either partially or fully. For example, in some embodiments, the first cross-sectional shape may be an extended rectangle or strip that is connected to itself and forms a ring along the groove surface. In some embodiments, the strip may have an aspect ratio of length l to width w of 7:1 or greater, e.g. 10:1 or greater, e.g. 15:1 or greater. In some embodiments, the extended rectangle may have an aspect ratio of between 7:1 and X:1 where X is equal to πd/w, where d is the tread diameter, and w is the groove width. This means that for a large tread having a diameter of about 1000 mm, and an exemplary groove width of 20 mm, X is 157. In some other embodiments, the elongate strip may extend at a non-zero angle to the circumferential direction of the groove, e.g. at an angle of at least 30°, 40°, 45°, 50°, 60°, 70°, 80°, or at an angle of about 90° (i.e. perpendicular to the circumferential direction of the groove.)

More generally, it will be appreciated that the first cross-sectional shape may have any suitable and/or desirable orientation with respect to the groove surface. In some embodiments, the first cross-sectional shape may have a longitudinal axis that is orientated to be parallel with the circumference of the tire and groove surface. For example, when the first cross-sectional shape is a rectangle, the rectangle may be orientated such that it forms a series of lines extending around the tire's circumference. In some embodiments the first cross-sectional shape may have a longitudinal axis aligned perpendicular to the groove wall surface, e.g. the first-cross sectional shape may extend across the width of a groove. In some embodiments, the first cross-sectional shape may extend diagonally across the grove, e.g. the lines or extended rectangles may extend diagonally across the groove surface.

To ensure that the elements demonstrate resistance to aging, preferably the element volume is greater than about 0.1 mm³. In some embodiments, the elements may have an element volume greater than 0.2 mm³, e.g. greater than 0.25 mm³, e.g. greater than 0.3 mm³, e.g. greater than 0.35 mm³, e.g. greater than 0.4 mm³, e.g. greater than 0.45 mm³, e.g. greater than 0.5 mm³, e.g. greater than 0.55 mm³, e.g. greater than 0.6 mm³. The inventors have recognised that increasing the element volume above 0.1 mm³ may assist with maintaining a relatively high contact angle even when the tire has aged, but the effect tends to plateau if the volume is too high. For larger element volumes the void ratio of the pattern, as discussed below, may be affected. Hence the elements may have an element volume up to about 0.5 mm³, e.g. up to about 0.6 mm³, e.g. up to about 0.7 mm³, e.g. up to about 0.8 mm³, e.g. up to about 0.9 mm³, e.g. up to about 1.0 mm³, e.g. up to about 1.1 mm³, e.g. up to about 1.2 mm³, e.g. up to about 1.3 mm³, e.g. up to about 1.4 mm³, e.g. up to about 1.5 mm³. In some embodiments, the elements may have an element volume between 0.1 and 1.5 mm³.

In some embodiments, as mentioned above, the elements may not be point-like but may instead extend as an elongate strip having a length l much greater than the width w. For such elements the element volume may be X times a range of 0.1 to 1.5 mm$^3$, where X is $\pi$d for a tread diameter d.

It will be appreciated that the void volume is dependent on the spaced apart arrangement of the elements i.e. the spacing between elements. The spacing between adjacent elements in the arrangement may be defined by at least a first nearest neighbour spacing, s. In some embodiments, the arrangement may be further characterised by a second nearest neighbour spacing, s$_2$, wherein the second nearest neighbour spacing is greater than the first nearest neighbour spacing. Such nearest neighbour spacings can be defined for either random or ordered arrangements.

In some embodiments, the arrangement of the plurality of elements is a random arrangement. In such an arrangement the elements may be spaced from one another by a defined average spacing despite the arrangement being random. In some embodiments, the arrangement of the plurality of elements is an ordered arrangement. This could be a single occurrence of an ordered arrangement or the ordered arrangement could be repeated, e.g. a pattern. In some preferred embodiments the arrangement of the plurality of elements is a regular pattern. It will be appreciated that the elements may be arranged in any suitable and/or desirable pattern. In some embodiments, the pattern may be an isotropic pattern, e.g. identical in all directions. In some embodiments, the pattern may be anisotropic, e.g. the pattern may have a different nearest neighbour spacing in different directions.

In some embodiments, the pattern may be isotropic. For example, the pattern may be a cubic pattern, e.g. each element (e.g. a central element) is arranged to be equally spaced from four nearest neighbours such that three nearest neighbours form either a 90 degree angle or 180 degree angle, e.g. a repeating square pattern. In some embodiments, the pattern may be a repeating diamond pattern, e.g. each element (e.g. the central element) is arranged to be equally spaced from four nearest neighbours such that three nearest neighbours form an angle that is either less than 90 degrees or 180 degrees. In some embodiments, the pattern may be a repeating hexagonal pattern, e.g. each element is arranged to be equally spaced from six nearest neighbours.

In some embodiments, the pattern may be anisotropic. For example, the pattern may be a rectangular pattern, e.g. each element (e.g. the central element) has two nearest neighbour elements at 180 degrees relative to the central element, and two second nearest neighbour elements at 180 degrees relative to the central element, wherein the first nearest neighbour spacing is smaller than the second nearest neighbour spacing. For example, the pattern may be a parallelogram pattern, e.g. each element (e.g. the central element) has two nearest neighbour elements at 180 degrees relative to the central element, and two second nearest neighbour elements at 180 degrees relative to the central element, wherein the angle formed between any given first nearest neighbour and the central element and any given second nearest neighbour is not 90 degrees.

It will be appreciated that the pattern may be defined with respect to the central position of the first cross-sectional shape, such that the first nearest neighbour spacing, s, is calculated from the centre of the first cross-sectional area. Thus, the pattern arrangement is entirely independent from the first cross-sectional shape of the elements.

In some embodiments, the elements are spaced from one another in the arrangement by a typical or average spacing of between 50 to 500 μm, e.g. 100 to 500 μm, e.g. greater than 100 μm, e.g. greater than 200 μm, e.g. greater than 300 μm, e.g. greater than 400 μm, e.g. less than 500 μm, e.g. less than 400 μm, e.g. less than 300 μm, e.g. less than 200 μm, e.g. less than 100 μm. In some embodiments, the elements are spaced from one another in the arrangement by a typical or average spacing of between 0.5 mm and 1.5 mm. In some other embodiments, the elements are spaced from one another in the arrangement by a typical or average spacing of up to 2 mm, 2.5 mm or 3 mm. In various embodiments the arrangement is an isotropic pattern and this spacing is a first nearest neighbour spacing.

It will be appreciated that the elements may be formed by any suitable and/or desirable method. For example, the elements may be formed on the groove surface by removing material from the groove surface, by e.g. drilling, milling, ion milling, machining, electro-discharge machining, laser engraving, laser etching, plasma etching, chemical etching, photolithography, x-ray lithography, electron beam lithography, etching with a plasma, gas or liquid, probe microscopy, atomic force microscopy, nano-indentation microscopy, or evaporation. For example, the elements may be formed on the groove surface by displacing material at the groove surface, by e.g. embossing, stamping, molding, forging. For example, the elements may be formed on the groove surface by depositing material at the groove surface, by e.g. chemical vapor deposition, physical vapor deposition, electroplating, 3D metal printing, additive manufacturing, electrospinning.

In some embodiments, a laser engraving technique is used. The present invention therefore extends to a method of making a tread, according to any of the embodiments disclosed herein, using a laser engraving technique.

In some embodiments, a molding technique is used. The present invention therefore extends to a method of making a tread, according to any of the embodiments disclosed herein, using a molding technique. The present invention further extends to mold constructed for making a tread according to any of the embodiments disclosed herein.

In some embodiments, the elements may be formed on the groove surface using a molding or casting technique, wherein the mold comprises a negative of the element pattern which may be produced by any suitable and/or desirable technique. For example, the mold may be formed by one or more suitable techniques such as drilling, milling, ion milling, machining, electro-discharge machining, electroplating, laser etching, 3D metal printing, additive manufacturing techniques, plasma etching, chemical etching, photolithography, x-ray lithography, electron beam lithography, embossing, stamping, molding, forging, etching with a plasma, gas or liquid, probe microscopy, atomic force microscopy, nano-indentation microscopy, chemical vapor deposition, physical vapor deposition, evaporation, electrospinning.

In some embodiments, the arrangement of the plurality of elements is substantially the same across the groove surface. This can help to ensure a reliable hydrophobic performance. In some embodiments, a plurality of different arrangements may be present within a single groove. For example, the base surface of a groove (e.g. the groove surface which is substantially parallel to the outer surface of the pneumatic tire) may comprise a first arrangement of elements, and the wall(s) of the groove (e.g. a groove surface which is substantially perpendicular to the surface of the pneumatic tire) may comprise a second, arrangement of elements, wherein the first arrangement and the second arrangement are different. In some embodiments, the first and second arrangements may include elements having the same first and/or second cross-sectional shape and/or aspect ratio and/or volume, but the elements may be spaced apart differently in the first and second arrangements. In some embodiments, the first and second arrangements may have the same spacing of elements but the elements may have a different first and/or second cross-sectional shape and/or aspect ratio and/or volume. It will be understood that these parameters may be interrelated by the defined range for the void ratio.

In some embodiments, a single groove surface may comprise a plurality of arrangements of elements. For example, the groove surface may comprise an array of arrangements. For example, the groove surface may comprise a first arrangement extending along a circumferential direction of the groove and a second arrangement extending parallel to the first arrangement such that the groove surface comprises two different arrangements extending along the circumferential direction of the groove (e.g. around the tire's circumference). In some embodiments, the first arrangement is arranged to extend across the width of the groove and the second arrangement is arranged to extend across the width of the groove adjacent to the first arrangement, such that the array comprises two different arrangements alternately along the circumferential direction of the groove. In various embodiments the groove surface may comprise any suitable and/or desirable number and configuration of arrangements, whether one, two or more arrangements.

In some embodiments, the plurality of grooves extend along a circumferential direction of the tread (e.g. summer tires). In some embodiments, the plurality of grooves extend at an angle to a circumferential direction of the tread, for example in a V-shaped layout of grooves (e.g. winter tires).

In some embodiments, the grooves each have a width in the range of 0.2 to 20 mm. In some embodiments, the grooves each have a depth of at least 1 mm, preferably at least 1.6 mm, further preferably at least 2 mm. In some embodiments, the grooves each have a depth of 2-3 mm.

The disclosure herein relates to grooves formed in the tread of a pneumatic tire. The hydrophobic characteristics of a groove surface are therefore considered in the context of a groove surface made from a rubber material or rubber-type polymer material. In some embodiments the tread is made of a diene rubber compound. Diene rubbers, such as natural rubber, isoprene rubber and butadiene rubber, comprise repeat units derived from diolefins having a conjugated carbon-carbon double bond. The properties of synthetic diene rubbers can be specifically tailored by copolymerisation of diolefin monomers with other monomers and they are used in a wide range of applications, including tire treads. Stirene-butadiene rubber (referred to herein as "SBR") is one example of a butadiene rubber produced by polymerisation of stirene and butadiene. In some embodiments the tread is made of a silica-containing diene rubber compound, such as SBR-silica compounds.

A typical SBR-silica rubber compound is made according to the composition below (where "phr" is parts per hundred parts of the rubber).

| | phr |
| --- | --- |
| First mixing stage | |
| S-SBR | 80.0 |
| BR | 20.0 |
| Silica | 80.0 |
| Carbon Black | 8.0 |
| Silane | 8.0 |
| Plasticizer | 10.0 |

-continued

| | phr |
| --- | --- |
| Second mixing stage | |
| Sulfur | 1.5 |
| ZnO | 1.5 |
| Stearic acid | 1.5 |
| TBBS | 1.5 |
| DPG | 1.0 |
| Wax | 2.0 |

S-SBR is a polymer obtained through a solution polymerization process with an average molecular weight between $800\text{-}1500\times10^3$ and $500\text{-}900\times10^3$ respectively, with a stirene content between 10 to 45% and a vinyl content between 20 and 70%.

BR is a polymer consisting of polybutadiene.

Silica is a filler with a surface area of about 170 $m^2/g$ and marketed under the name Ultrasil VN3 by the company EVONIK.

Carbon black is N134.

The Silane binder is marketed under the name SI75 by the company EVONIK.

TBBS is the abbreviation of the compound N-tert-butyl-2-benzothiazylsulfenamide used as a vulcanization accelerator.

DPG is the abbreviation of the diphenyl-guanidine compound used as a vulcanization accelerator.

Some embodiments of the present invention are illustrated further by way of the following non-limiting examples and the accompanying figures, in which.

Figure 1:
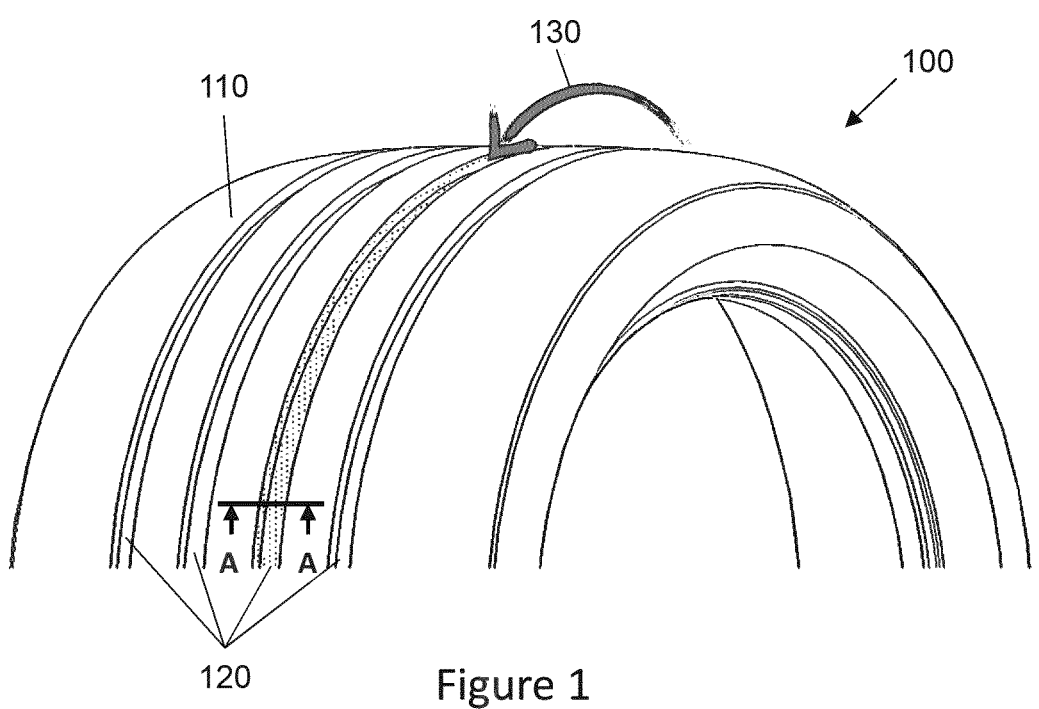
FIG. 1 shows the tread of a pneumatic tire comprising a plurality of grooves.
Figure 22:
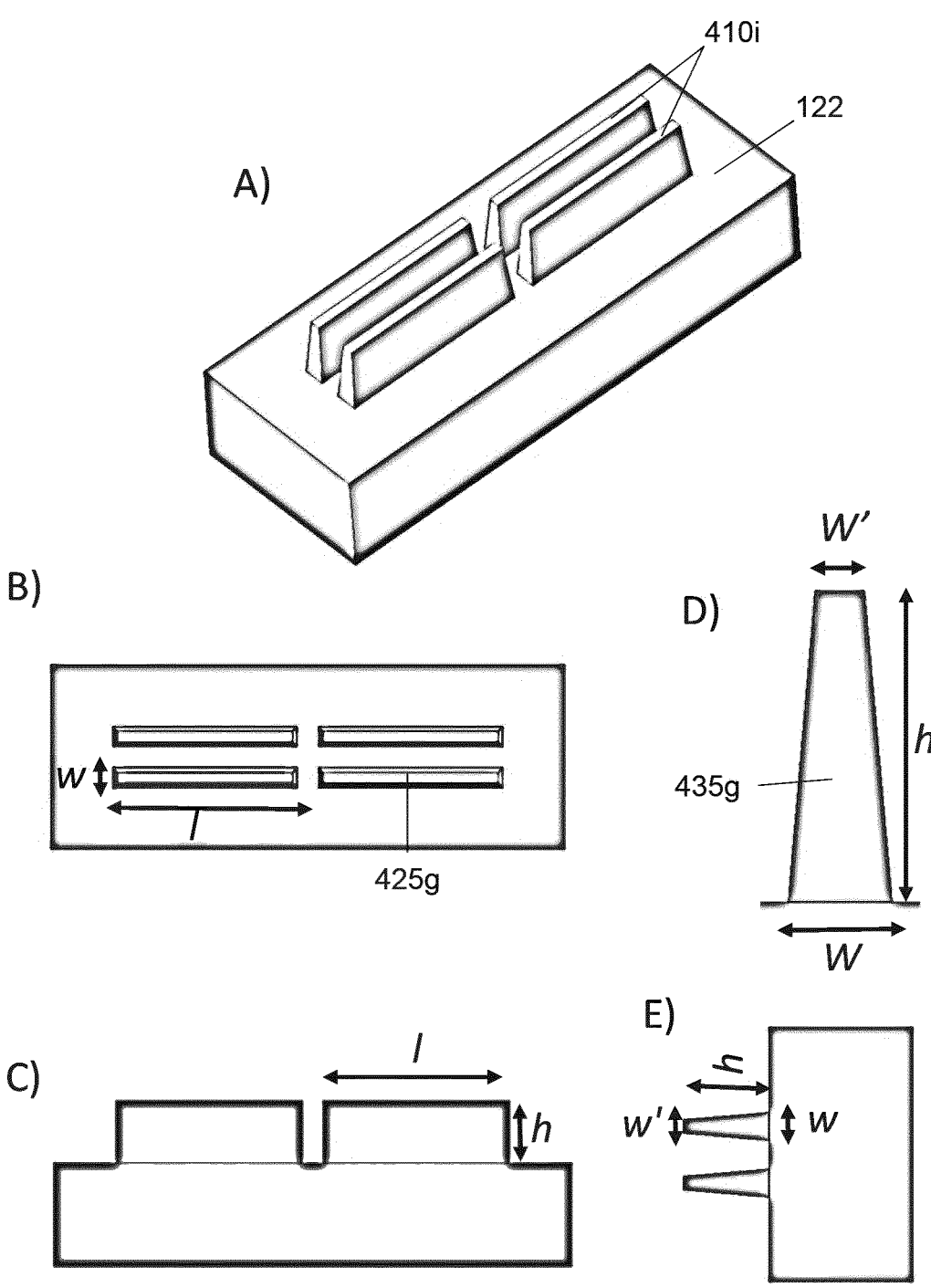
Figure 23:
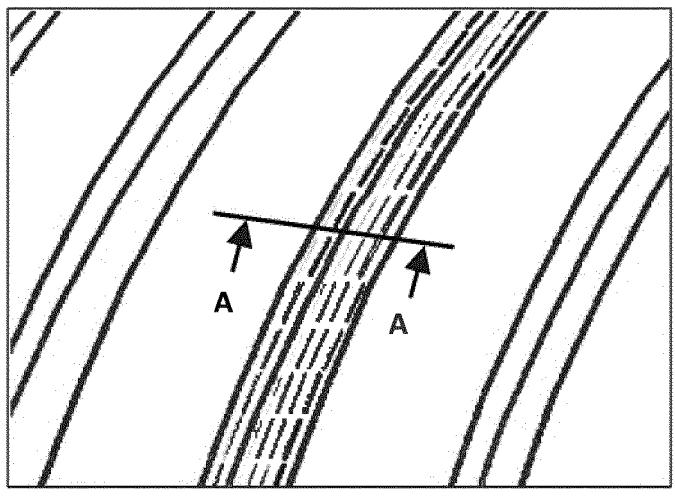
Figure 24:
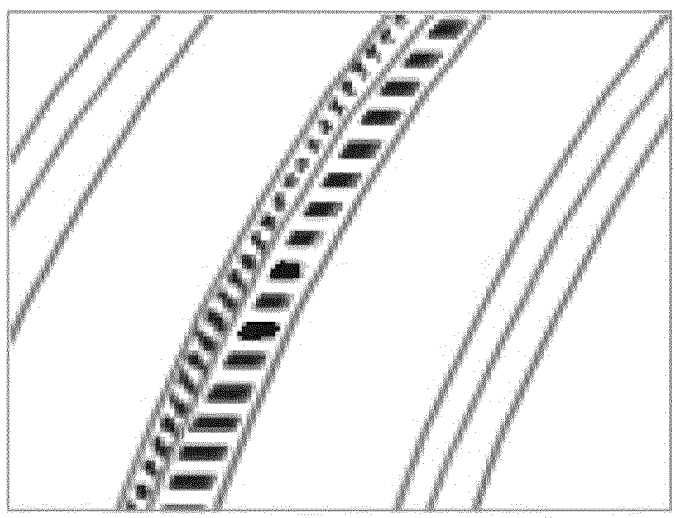

FIG. 14A shows elements on a groove surface in accordance with an embodiment of the present invention; FIG. 14B shows the first cross-sectional shape of the elements; FIG. 14C shows the second cross-sectional shape of the elements, and FIG. 14D shows a close up of the top of the second cross-sectional shape;

FIG. 15A shows elements on a groove surface in accordance with an embodiment of the present invention; FIG. 15B shows the first cross-sectional shape of the elements; FIG. 15C shows the second cross-sectional shape of the elements, and FIG. 15D shows a close up of the top of the second cross-sectional shape;

FIG. 16A shows elements on a groove surface in accordance with an embodiment of the present invention; FIG. 16B shows the first cross-sectional shape of the elements; FIG. 16C shows the second cross-sectional shape of the elements, and FIG. 16D shows a close up of the curved side of the second cross-sectional shape;

FIG. 17A shows elements on a groove surface in accordance with an embodiment of the present invention; FIG. 17B shows the first cross-sectional shape of the elements; FIG. 17C shows the second cross-sectional shape of the elements, and FIG. 17D shows a close up of the side and transition to the top of the second cross-sectional shape;

FIG. 18A shows elements on a groove surface in accordance with an embodiment of the present invention; FIG. 18B shows the first cross-sectional shape of the elements; FIG. 18C shows the second cross-sectional shape of the elements, and FIG. 18D shows a close up of the side and transition to the top of the second cross-sectional shape;

FIG. 19A shows elements on a groove surface in accordance with an embodiment of the present invention; FIG. 19B shows the first cross-sectional shape of the elements; FIG. 19C shows the second cross-sectional shape of the elements, and FIG. 19D shows a close up of the side and transition to the top of the second cross-sectional shape;

FIG. 20A shows elements on a groove surface in accordance with an embodiment of the present invention; FIG. 20B shows the first cross-sectional shape of the elements; FIG. 20C shows the second cross-sectional shape of the elements, and FIG. 20D shows a close up of the side and transition to the top of the second cross-sectional shape;

FIG. 21A shows elements on a groove surface in accordance with an embodiment of the present invention; FIG. 21B shows the first cross-sectional shape of the elements; FIG. 21C shows a second cross-sectional shape of the elements in one plane of the groove; FIG. 21D shows a second cross-sectional shape of the elements in a second plane of the groove;

FIG. 22A shows elements on a groove surface in accordance with an embodiment of the present invention; FIG. 22B shows the first cross-sectional shape of the elements; FIG. 22C shows a second cross-sectional shape of the elements in one plane of the groove; FIG. 22D shows a second cross-sectional shape of the elements in a second plane of the groove; FIG. 22E shows the elements in the second cross-sectional plane;

FIG. 23 shows the grooves of a tire tread with the elements of FIG. 22 orientated with the longitudinal axis along the circumferential direction;

FIG. 24 shows the grooves of a tire tread with the elements of FIG. 22 orientated with the longitudinal axis perpendicular to the circumferential direction; and FIG. 25A to G shows the first cross-sectional shape, the second cross-sectional shape, and the 3D shape, of a plurality of elements in accordance with various embodiments of the present invention.

FIG. 1 shows the tread 110 of a pneumatic tire 100 comprising a plurality of grooves 120 extending along the circumference of the tread 110 parallel to the circumferential direction 130.

Figure 2:
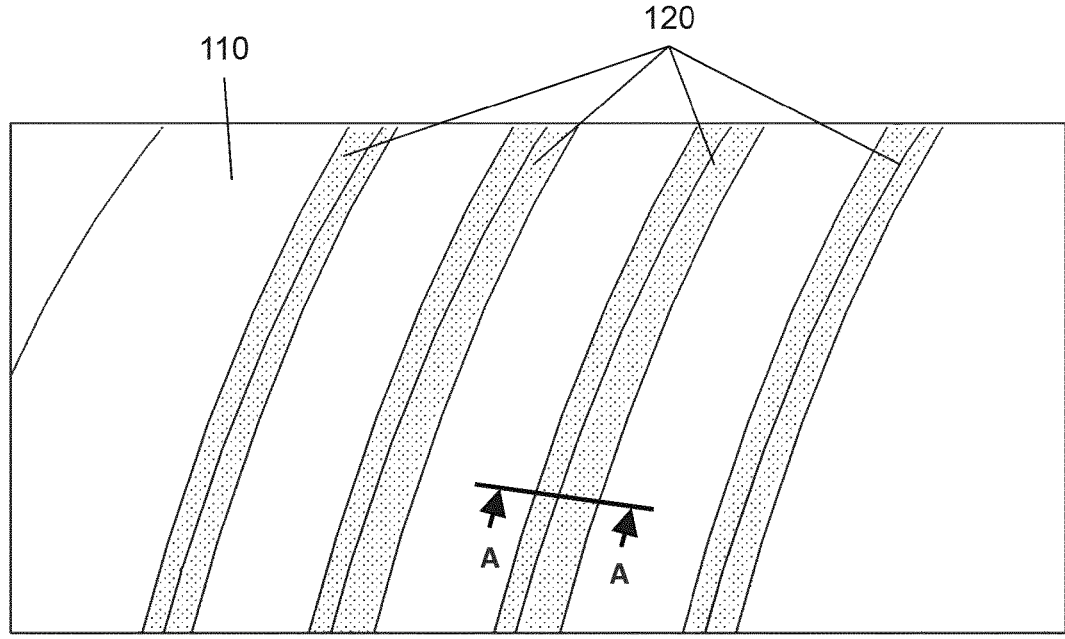
FIG. 2 shows a close up of the tread represented in FIG. 1, where the grooves comprise a plurality of elements in an arrangement on the groove surface(s).

FIG. 2 shows a close up of the tread 110 represented in FIG. 1, where the grooves 120 comprise a plurality of elements arranged along the groove surface(s) represented as dots within the groove 120.

Figure 3A:
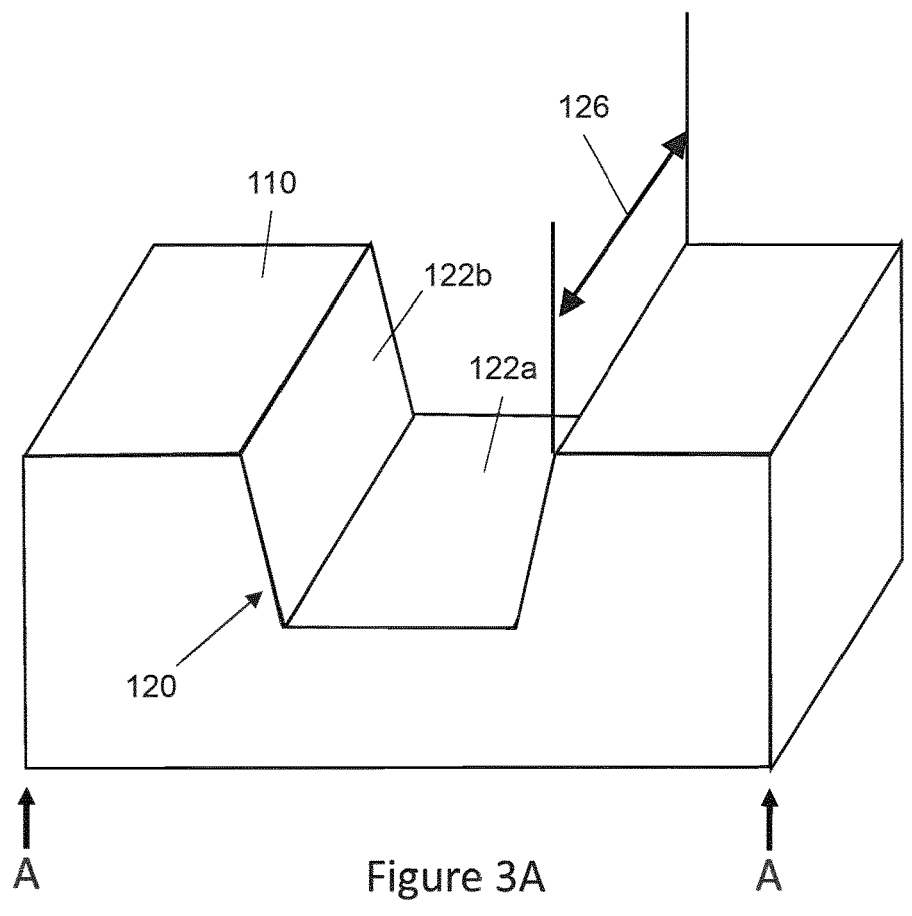
FIG. 3A shows a close up of a groove of the tread represented in FIGS. 1 and 2 along the A-A distance.
Figure 3B:
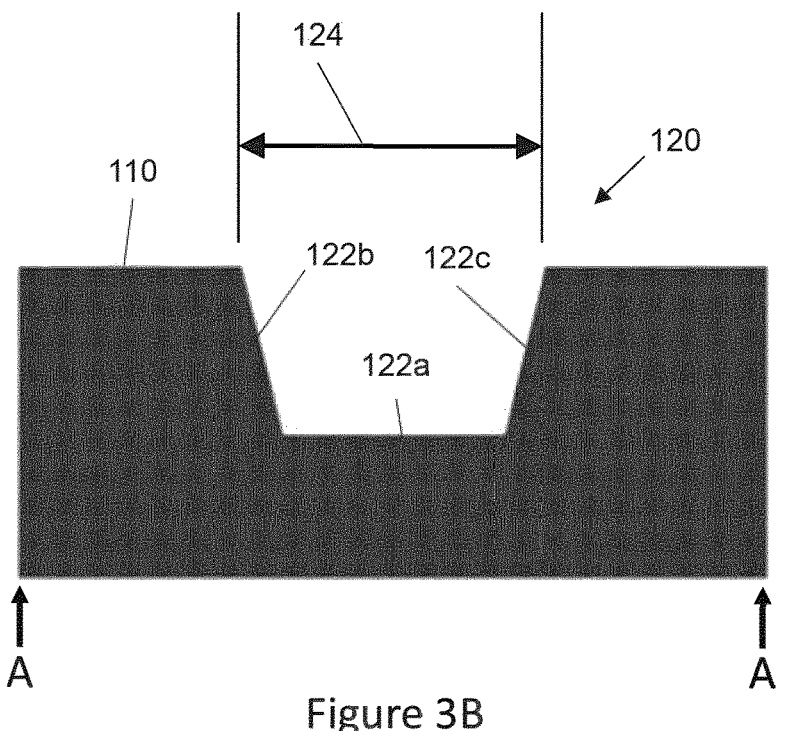
FIG. 3B shows a cross-section of a groove along the A-A distance shown in FIG. 1 and FIG. 2 comprising three surfaces: two walls and a base.

FIGS. 3A and 3B shows a close-up of the groove 120 along the A-A distance shown in FIG. 1 and FIG. 2. The groove 120 has a U-shaped cross-section in the axis perpendicular to the circumferential axis and thus the groove 120 comprises three groove surfaces 122: two walls 122b, 122c and a base 122a. The groove 120 has a width 124 perpendicular to the circumferential direction, and a extending along 126 the circumferential direction.

Figure 4:
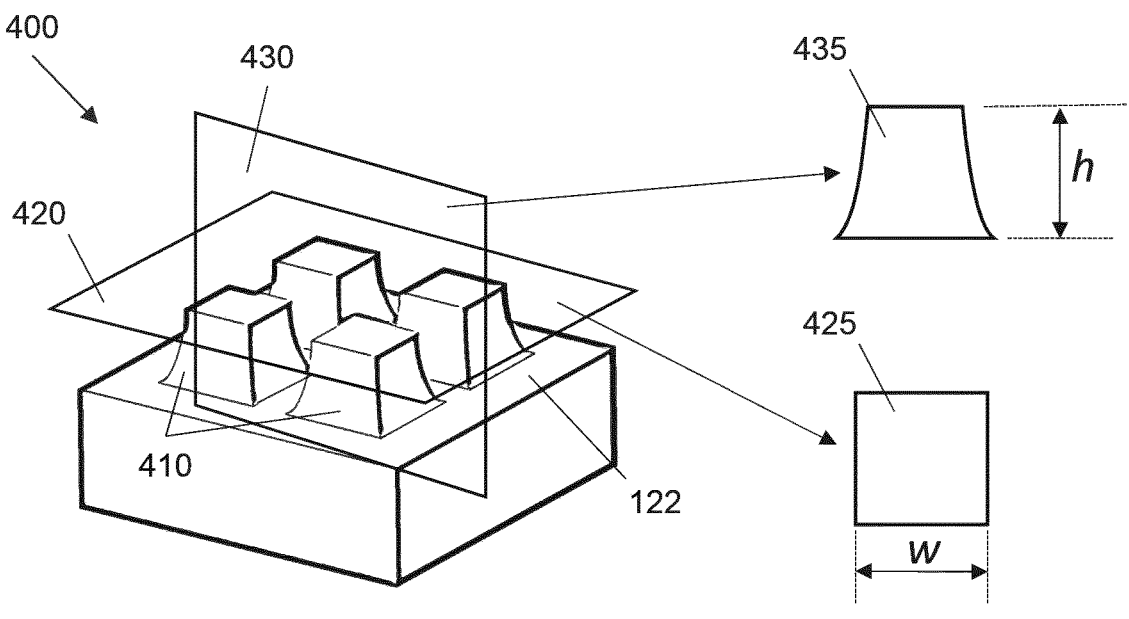
FIG. 4 shows the shape of the elements in an arrangement on the groove surface in accordance with an embodiment of the present invention.

FIG. 4 shows an embodiment of elements 410 in an arrangement 400 on the groove surface 122. The elements 410 may be described with respect to their cross-sectional shape in the first cross-sectional plane 420 and the second cross-sectional plane 430. The first cross-sectional plane 420 is a plane parallel to the surface of the groove and thus the first cross-sectional shape 425 of the element 410 is essentially a footprint of the element on the groove surface and thus defines the width w of the element 410. The second cross-sectional plane 430 is a plane perpendicular to groove surface and perpendicular to the circumferential axis and thus the second cross-sectional shape 435 of the element 410 defines the height h of the element 410. In this embodiment the second cross-sectional shape 435 of the element 410 is the same even if the second cross-sectional plane 430 is rotated through 90°. In other words, the elements 410 are point-like rather than elongate.

In the embodiment shown in FIG. 4, the first cross-sectional shape 425 is a square and the second cross-sectional shape 435 is a truncated hyperbola having smooth continuous curved sides and two parallel top and bottom edges. This is given by way of example, but the elements 410 may have a wide variety of different shapes, as will be appreciated from the description below.

Figure 5:
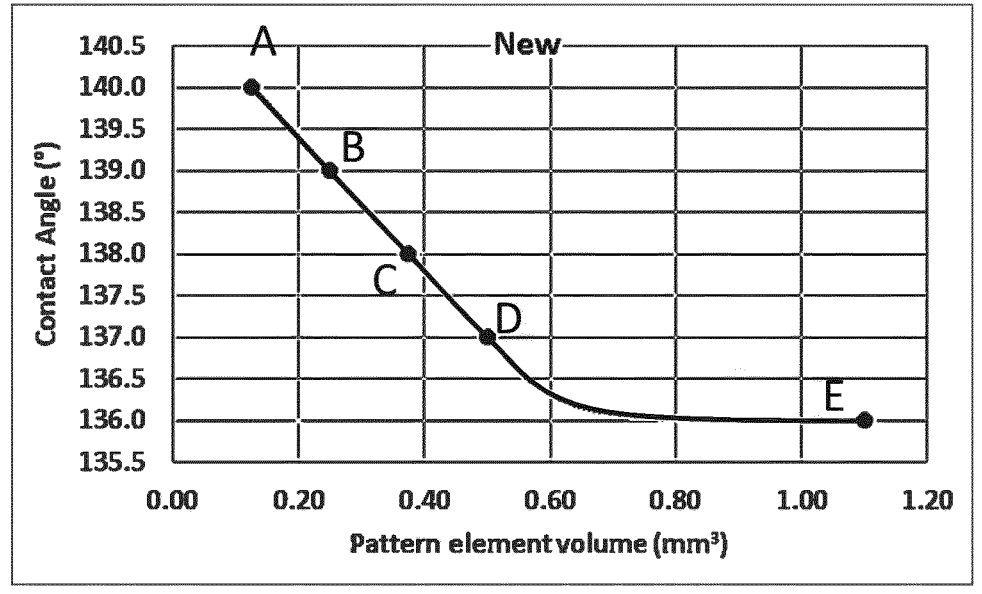
FIG. 5 shows the relationship between the contact angle of a water droplet interacting with a surface and the volume of the elements arranged on the surface when the elements are new on the surface.

FIG. 5 shows the inverse functional relationship between the element volume and the contact angle formed between a static water droplet and a groove comprising the plurality of elements 410 when newly formed.

As can be seen from FIG. 5, as the element volume increases, the contact angle formed between the elements 410 and a static water droplet decreases, e.g. the surface becomes decreasingly hydrophobic. As can be seen from the trend shown in FIG. 5, eventually the element volume size reaches a volume where further increases in volume do not result in significant reductions in the contact angle, e.g. the functional relationship plateaus at approximately 136 degrees for the data represented in FIG. 5. This may be thought to arise because the volume becomes so large that the surface, when viewed by the element, is essentially continuous and thus the contact angle tends to the contact angle that would have been observed in the absence of any elements whatsoever.

From the relationship shown in FIG. 5, it is clear that to obtain a groove surface 122 demonstrating good hydrophobic characteristics an element 410 with a minimal element volume is desired, e.g. tending towards needle-like structures having a volume less than 0.1 mm³.

Figure 6:
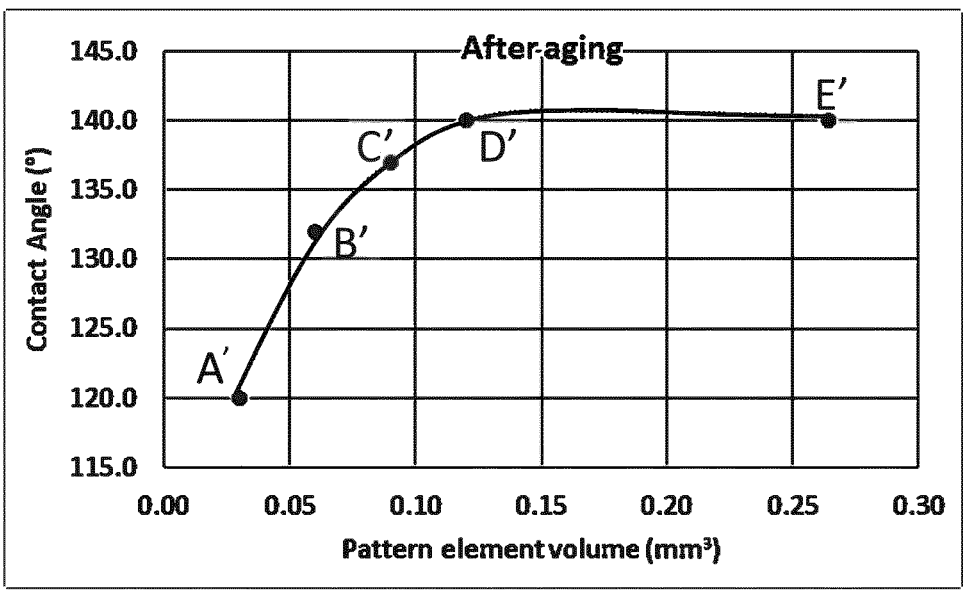
FIG. 6 shows the relationship between the contact angle of a water droplet interacting with a surface and the volume of the elements arranged on the surface after the elements have aged.

FIG. 6 shows the same relationship as is shown in FIG. 5 (e.g. the relationship between element volume and the contact angle formed between a static water droplet and the plurality of elements) but for an aged surface, rather than a new surface (as is represented in FIG. 5). As can be seen from the data shown in FIG. 6, the contact area formed between a static water droplet and the elements 410 of the present invention declines rapidly (e.g. becomes less hydrophobic) as the element volume decreases below 0.15 mm³.

The data points represented on FIG. 6 correspond directly to the data points represented on FIG. 5. For example, data point A on FIGS. 5 and A' on FIG. 6 measures the contact angle for the same element 410 at two different periods of time: when the element 410 is newly formed having a volume of approximately 0.15 mm³ (FIG. 5) and after the element 410 has aged and lost 75% of its material volume to have a volume of approximately 0.03 mm³ (FIG. 6).

Figure 7:
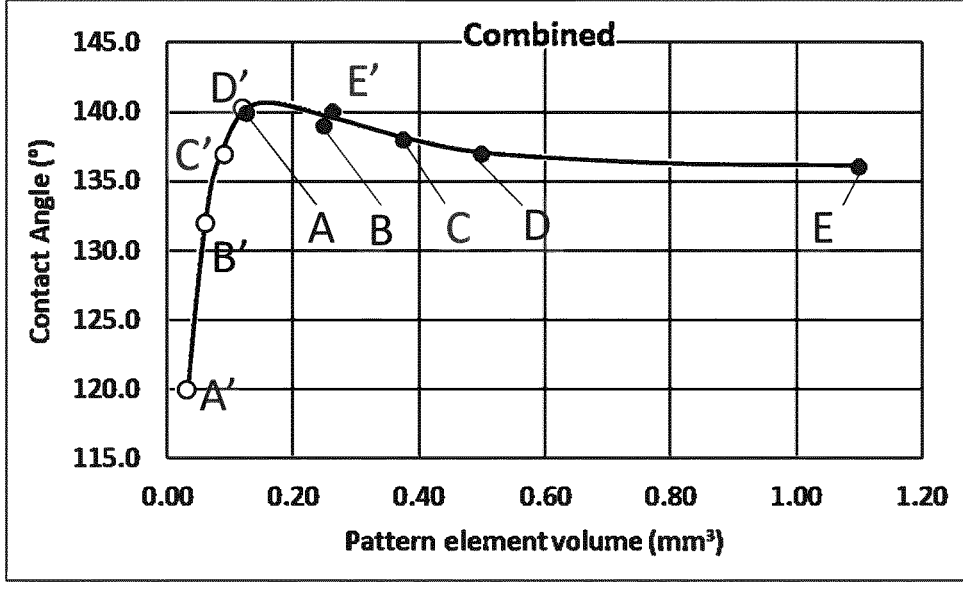
FIG. 7 shows a combination of the data shows in FIGS. 5 and 6.

FIG. 7 shows the combined data from FIGS. 5 and 6, showing how the relationship between element volume and contact angle formed with a static water droplet varies with element volume.

FIGS. 5, 6 and 7 thus show that elements 410 having a smaller volume when new exhibit a greater aging effect on the hydrophobic characteristics such that smaller element volumes (e.g. data points A/A', B/B' and C/C') although initially the most hydrophobic (FIG. 5) become less hydrophobic more quickly than larger volumes. As such, the effect of aging and the hydrophobic characteristics of the surface 122 when new have opposing requirements from the element volume.

In contrast, larger element volumes when new (e.g. above 0.5 mm³ as shown by data points D and E) exhibit a lesser aging effect and thus reduced change in hydrophobic characteristics after aging (as shown by data points D' and E'). For example, FIG. 6 shows that after aging, elements 410 D' and E' have sustained approximately the same hydrophobicity (e.g. contact angle with water) even after approximately 75% of the element volume has been lost.

It can be seen from FIG. 7 that elements 410 having a volume of less than 0.1 mm³ suffer a drastic reduction in contact angle after aging of the tread 110. It is therefore beneficial for the element volume to be greater than 0.1 mm³.

The inventors have appreciated that it is important to maximise the volume of the element 410 in order to improve aging resistance and maintain hydrophobicity as a tire tread ages. An object of the present invention is thus the provision of arrangements (e.g. patterns) for groove surfaces 122 that maximise the element volume whilst minimising the contact area (and thus contact angle) between the elements 410 and a water droplet.

A solution as envisaged by the present invention is to provide elements 410 with shapes that have a base that is wider than their top, e.g. comprising sloping sides and/or curved or angled top surfaces (e.g. filleted sides, e.g. chamfered, e.g. bevelled). The top surface of each element may be considered to represent its real contact area in relation to water droplets coming into contact with the groove.

Figure 8:
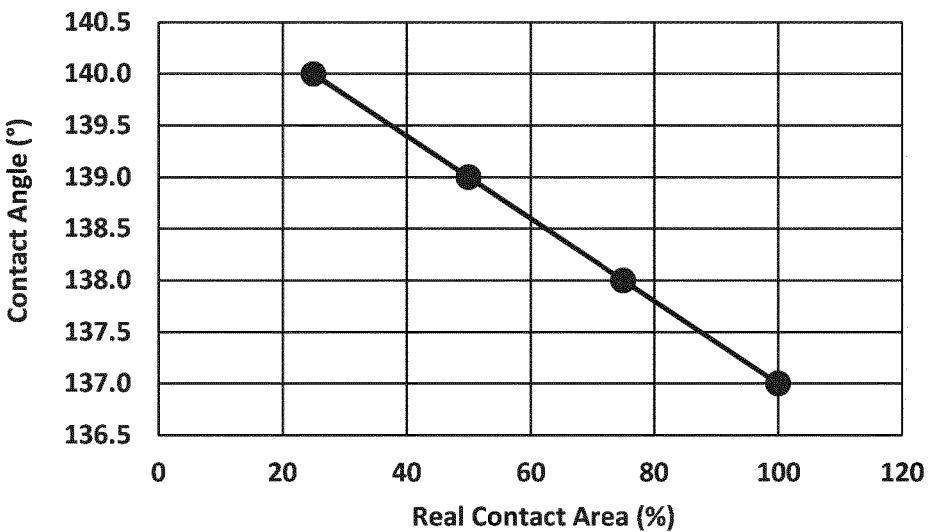
FIG. 8 shows the relationship between the real contact area of an element and the contact angle formed between a water droplet and a surface comprising said element.

FIG. 8 shows the relationship between the real contact area of an element 410, normalised with respect to a pillar surface comprising a flat top, and the contact angle formed with a static water droplet. Thus, it will be appreciated that a 100% surface area represents a straight edged pillar-shaped element structure and a flat top surface (e.g. comprising a rectangular or square second cross-sectional shape). The real contact area is thus reduced by rounding off the corners of the cross-sectional shape at the surface that contacts the water droplet such that the flat top becomes increasingly reduced.

As can be seen, as the contact area is reduced with increased extent of rounding of the corners of the second cross-sectional shape of the element, the contact angle increases (e.g. the top surface becomes increasingly hydrophobic).

The inventors have thus appreciated that by rounding or angling the sides of the element shape, a surface comprising favourable hydrophobic characteristics may be produced whilst still retaining high element volumes that provide improved aging resistance.

Figure 9:
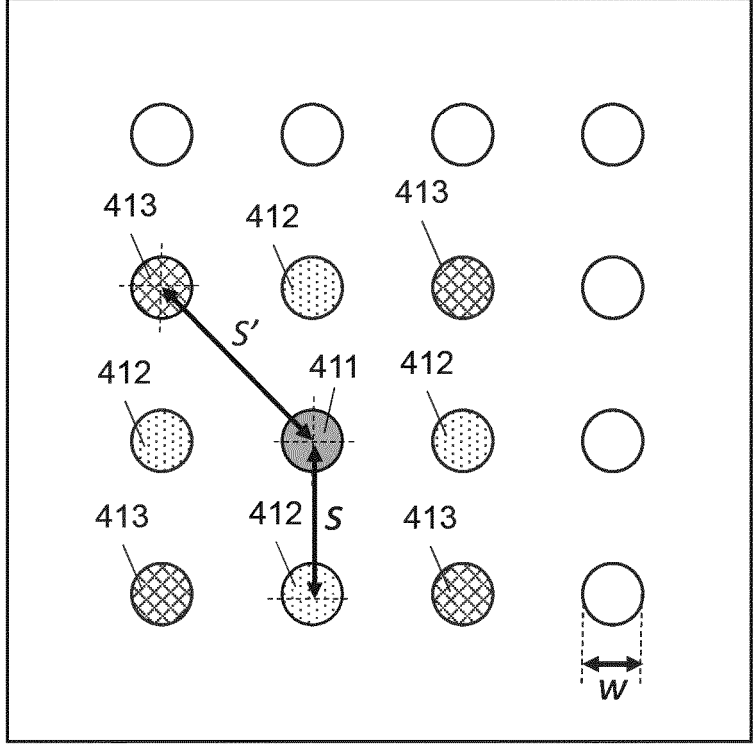
FIG. 9 shows an arrangement of elements in the first cross-sectional plane in accordance with an embodiment of the present invention.

FIG. 9 shows a cross-section (in the first cross-sectional plane 420 parallel to the groove surface) of a pattern of elements in accordance with an embodiment of the present invention. In the pattern shown (e.g. a cubic pattern), the elements 411 are shown to have both a first nearest neighbour 412 and a second nearest neighbour 413 wherein the first nearest neighbour has a smaller spacing distance s than the second nearest neighbour spacing s'. For the cubic pattern shown, the second nearest neighbours 413 define a square around the central element 411 (e.g. the central element 411 is positioned at the centre of the square) and the first nearest neighbours 412 are positioned along the midpoints of the sides of the square defined by the second nearest neighbours 413.

The nearest neighbour spacing s, s' is defined as the centre-to-centre distance of the first cross-sectional shapes of the element 411, e.g. the distance between the centre of the first cross-sectional shape of the central element 411 and the centre of the cross-sectional shape of the first and/or second nearest neighbour.

Figure 10:
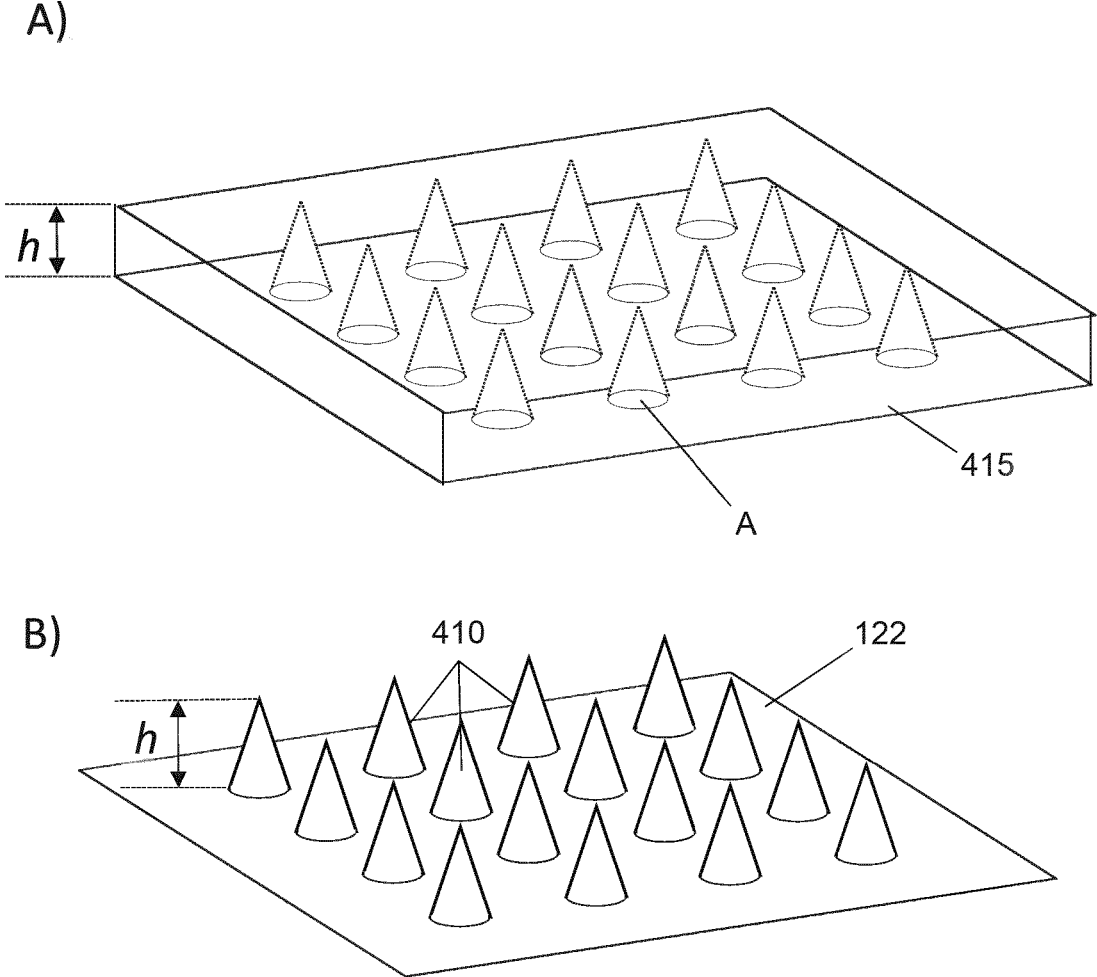
FIG. 10A shows a corresponding void volume formed by the arrangement of elements shown in FIG. 10B in accordance with an embodiment of the present invention.

FIG. 10B shows a three-dimensional representation of a groove surface 122 and a plurality of conical elements 410 (by way of example) in a protruding arrangement on the groove surface 122. In this example the arrangement comprises a cubic pattern. It can be seen that the total volume of the elements 410 in the arrangement is the sum of ⅓Ah for all of the conical elements 410, where A is the area of the base at the groove surface 122 and h is the height of the conical elements 410. FIG. 10A shows the three-dimensional void volume 415 formed as the negative volume of the total element volume, e.g. the void volume is the volume formed by the spaces between the elements 410. As shown in FIG. 10A, the void volume 415 does not occupy the same volume or space as the total element volume, such that the void volume 415 may be considered to fit around the elements 410 to create a solid volume across the groove surface 122 up to the height h, e.g. the void volume and element volume have a lock-and-key fit. It will be appreciated that the void volume 415 in combination with the total element volume may not completely fill the available volume of the groove (e.g. a groove as seen in FIG. 3).

Figure 11:
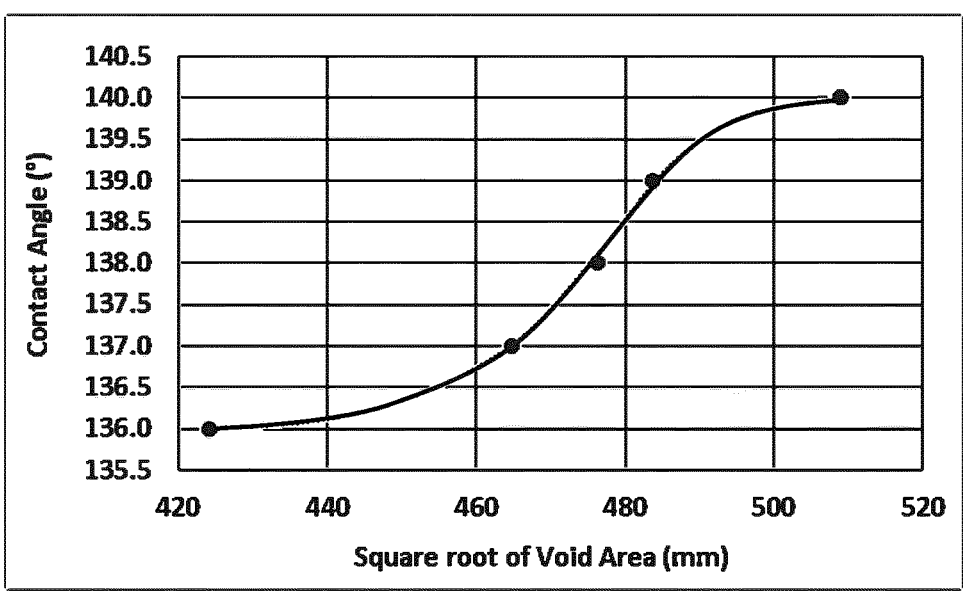
FIG. 11 shows the relationship between the contact angle of a water droplet interacting with a surface and a spacing parameter for an arrangement of elements on that surface.

FIG. 11 shows the functional relationship between the contact angle formed between a static water droplet and a plurality of elements 410 in accordance with an embodiment of the present invention and the space between the elements 410 (in millimetres). As can be seen from the data shown, as the void area decreases, e.g. the spacing s between the elements 410 decreases, the contact angle between a static water droplet and the elements 410 decreases. As such, the inventors have surprisingly appreciated that it is advantageous to have a greater void volume between elements 410 in accordance with the present invention.

Figure 12:
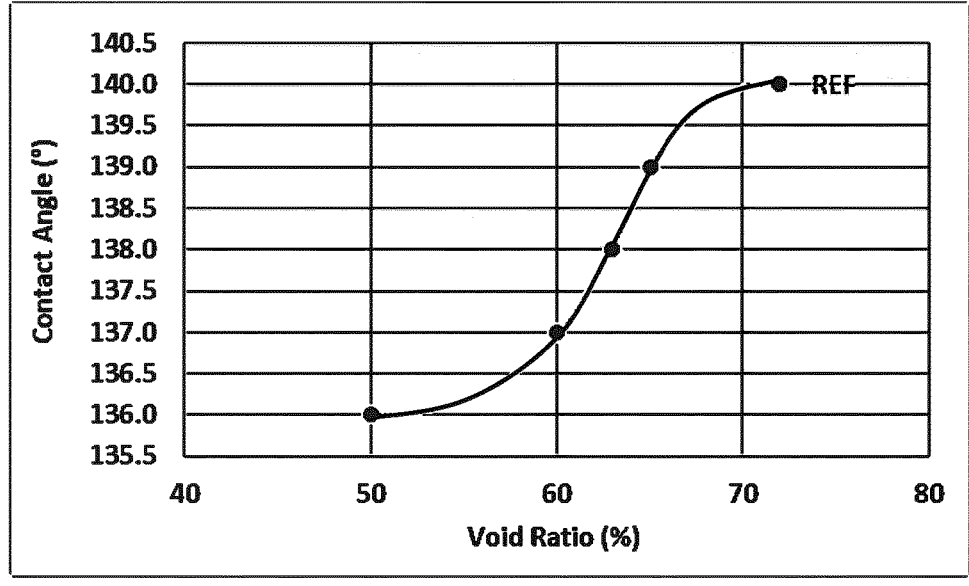
FIG. 12 shows the relationship between the contact angle of a water droplet interacting with a surface and the void ratio formed by elements arranged on that surface.

FIG. 12 shows the functional relationship between the contact angle formed between a static water droplet and a plurality of elements 410 in accordance with an embodiment of the present invention and the void ratio of the element pattern arranged on the surface. Similarly to FIG. 11, it can be seen that as the void ratio increases, and the elements 410 become increasingly spaced, the contact angle increases and the surface becomes more hydrophobic.

From both FIGS. 11 and 12 it can be seen that the relationship between the contact angle and the 1 dimensional and 3 dimensional space between the elements on a surface is sinusoidal in shape. Thus, it can be appreciated that it is preferable to select a spacing between elements and an element volume that allows an optimal void ratio.

Figure 13:
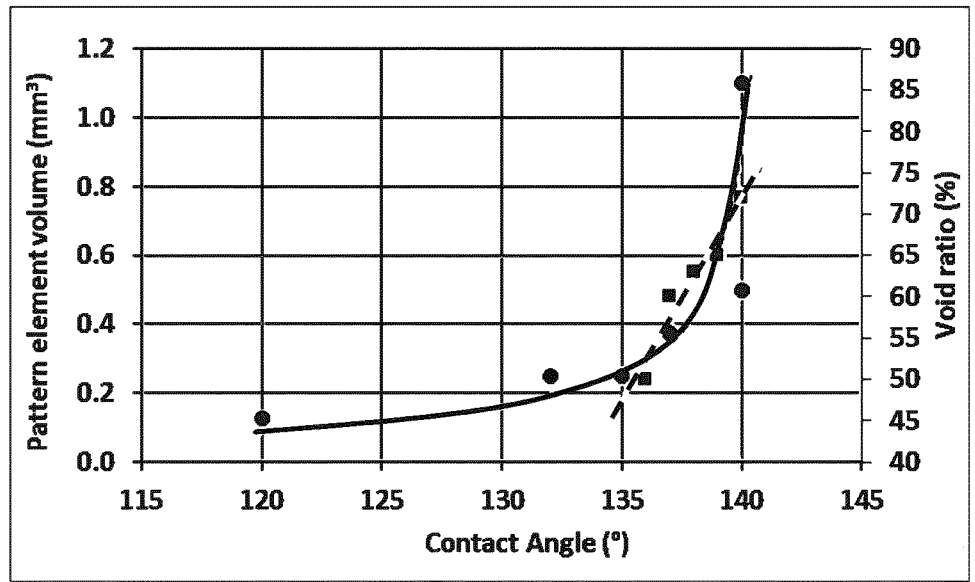
FIG. 13 shows a combination of the data represented in FIGS. 11 and 12.

FIG. 13 combines the data from FIG. 12 and FIG. 6 to show how the optimisation between void ratio and element volume may be determined. As can be seen from FIG. 13, the optimal ranges of the void ratio and the element volume may be obtained by determining where the curve corresponding to the relationship between the void ratio and the contact angle intersects the curve corresponding to the relationship between the element volume and the contact angle. As such, for the example shown in FIG. 13, the optimal range may be determined to be a pattern comprising a void ratio between 50% and 65% and an element volume of between 0.2 and 0.6 mm³.

FIGS. 14 to 22 show various embodiments of element shapes at various cross-sections and angles in accordance with some embodiments of the present invention. All elements depicted therein have a height h of 0.6 mm, by way of example only.

FIG. 14A shows elements 410a on a groove surface 122 in accordance with an embodiment of the present invention with a first nearest neighbour spacing s of 1.2 mm. FIG. 14B shows the first cross-sectional shape 425a of the elements 410a in the first cross-sectional plane 420 as being square with a width w of 0.6 mm. FIG. 14C shows the second cross-sectional shape 435a of the elements being an irregular hexagon having two pairs of parallel sides and two chamfered corners, e.g. the second cross-sectional shape is substantially a square pillar shape with a chamfered top (i.e. two chamfered corners between the sides and the top). FIG. 14C also shows that the width w at the base of the second cross-sectional 435a shape is greater than a corresponding width w' at the top of the second cross-sectional shape. FIG. 14D shows a close up of one of the chamfered corners and shows that the corner is cut away at a 45° angle relative to the side and top edges of the shape with a chamfer depth of 0.15 mm.

Figure 14:
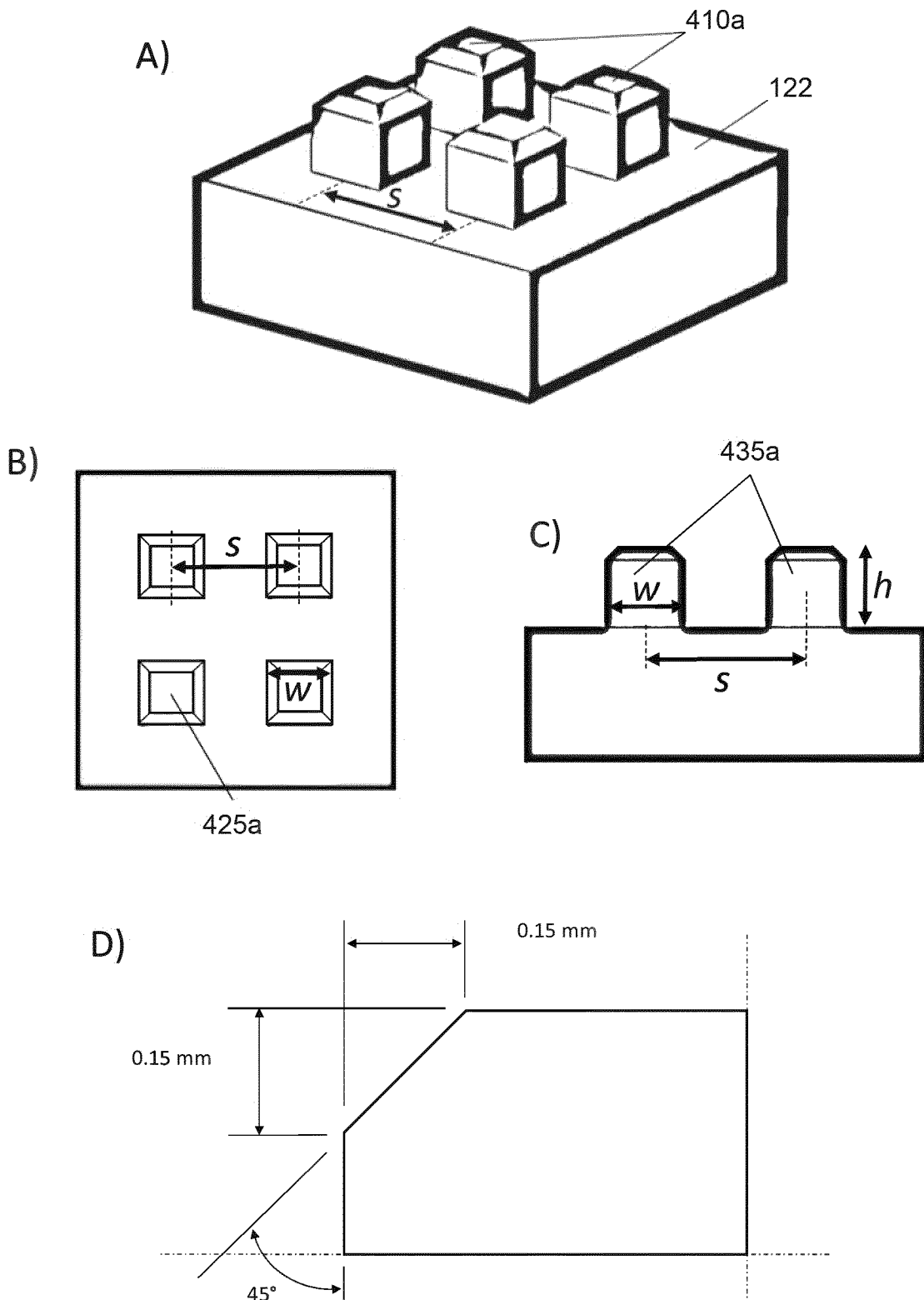
Figure 15:
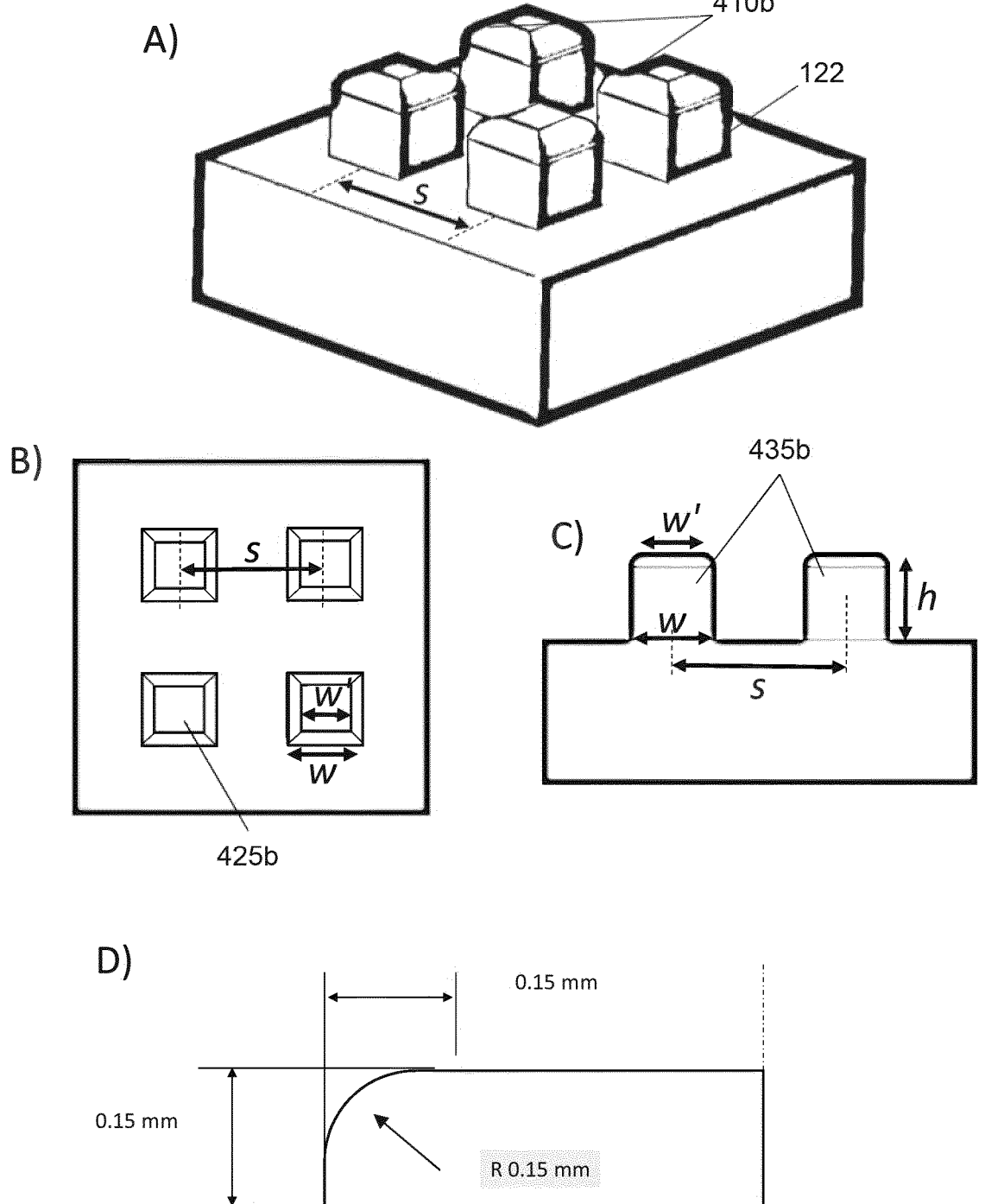

FIG. 15A to 15D shows elements 410b on the groove surface 122 which are substantially the same as the elements shown in FIG. 14 with the only difference being that the elements shown in FIG. 15 have rounded (e.g. filleted) top corners having a radius of curvature of 0.15 mm rather than chamfered (as shown in FIG. 14). However, because the radius of curvature is equal to the chamfer depth (e.g. 0.15 mm) the contact area of the flat top surface is the same in both elements shown in FIGS. 14 and 15. It can be seen that the second cross-sectional shape 435b shown in FIG. 15C is a pillar shape with a filleted top such that the width w at the base of the second cross-sectional shape 435b is greater than a corresponding width w' at the top of the second cross-sectional shape 435b.

Figure 16:
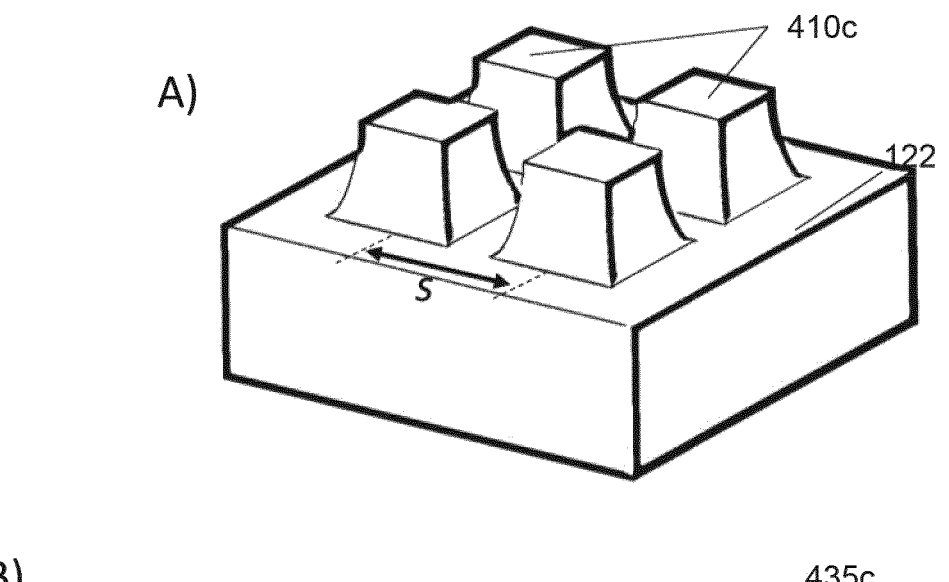
Figure 16:
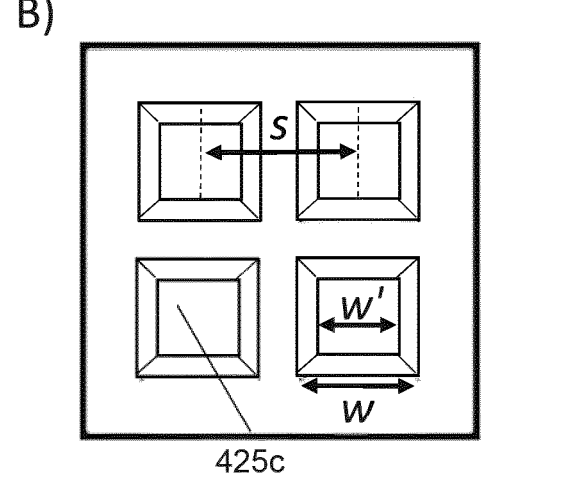
Figure 16:
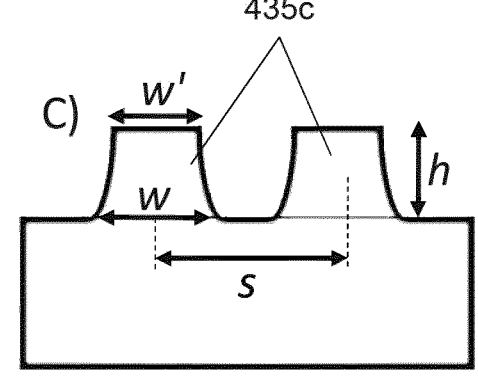
Figure 16:
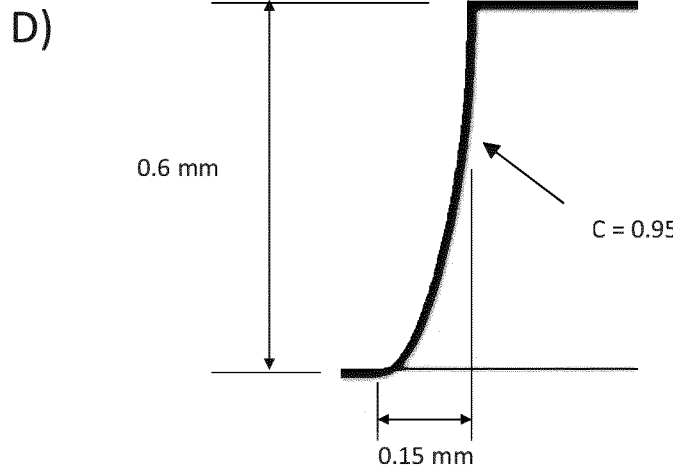

FIG. 16 shows elements 410c on a groove surface 122 which, similarly to FIGS. 14 and 15, have a first cross-sectional shape 425c of a square with a first nearest neighbour spacing of 1.2 mm and a width of 0.6 mm. In contrast to FIGS. 14 and 15, the elements 410c have a second cross-sectional shape 435c corresponding to a truncated hyperbola, e.g. having two parallel edges which are connected by two, non-parallel concave curved edges. FIG. 16C shows that the width w at the base of the second cross-sectional shape 435c is greater than a corresponding width w' at the top of the second cross-sectional shape 435c. FIG. 16D shows that the curved side has a depth of 0.15 mm such that the base of the element 410c has a width of 0.3 mm (e.g. the top surface of the element 410c has an area that is a quarter of the area of the base).

Figure 17:
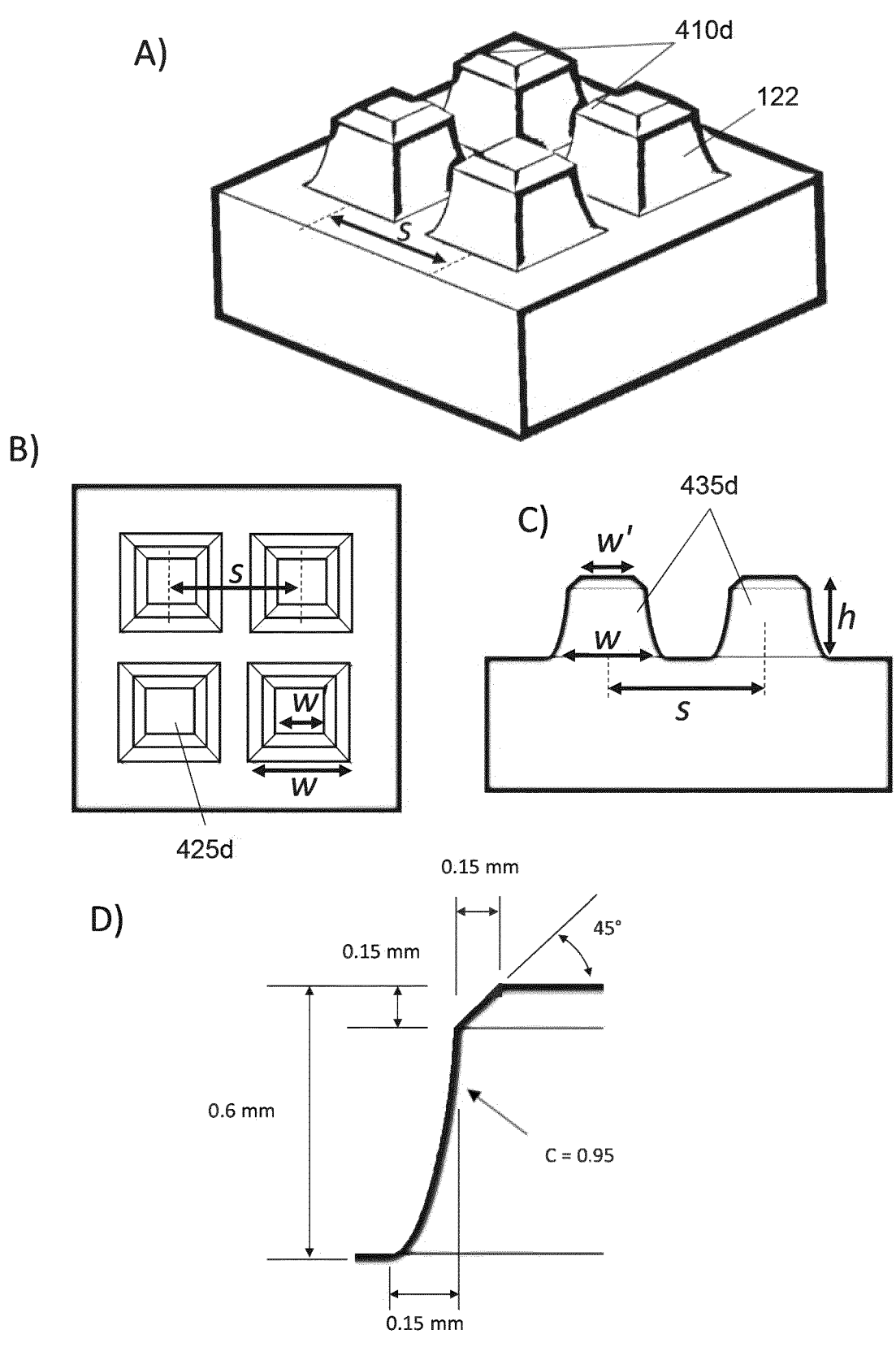

FIG. 17 shows elements 410d on a groove surface 122 which are a combination of the elements shown in FIG. 14 and FIG. 16, e.g. the second cross-sectional shape 435d comprises a truncated hyperbola having a chamfered top edge with a chamfer depth of 0.15 mm. The first cross-sectional shape 425d is a square having a width of 0.9 mm such that the width of the top surface (e.g. the square root of the surface area of the element that contacts the water droplets) is 0.3 mm. FIG. 17C shows that the width w at the base of the second cross-sectional shape 435d is greater than a corresponding width w' at the top of the second cross-sectional shape 435d.

Figure 18:
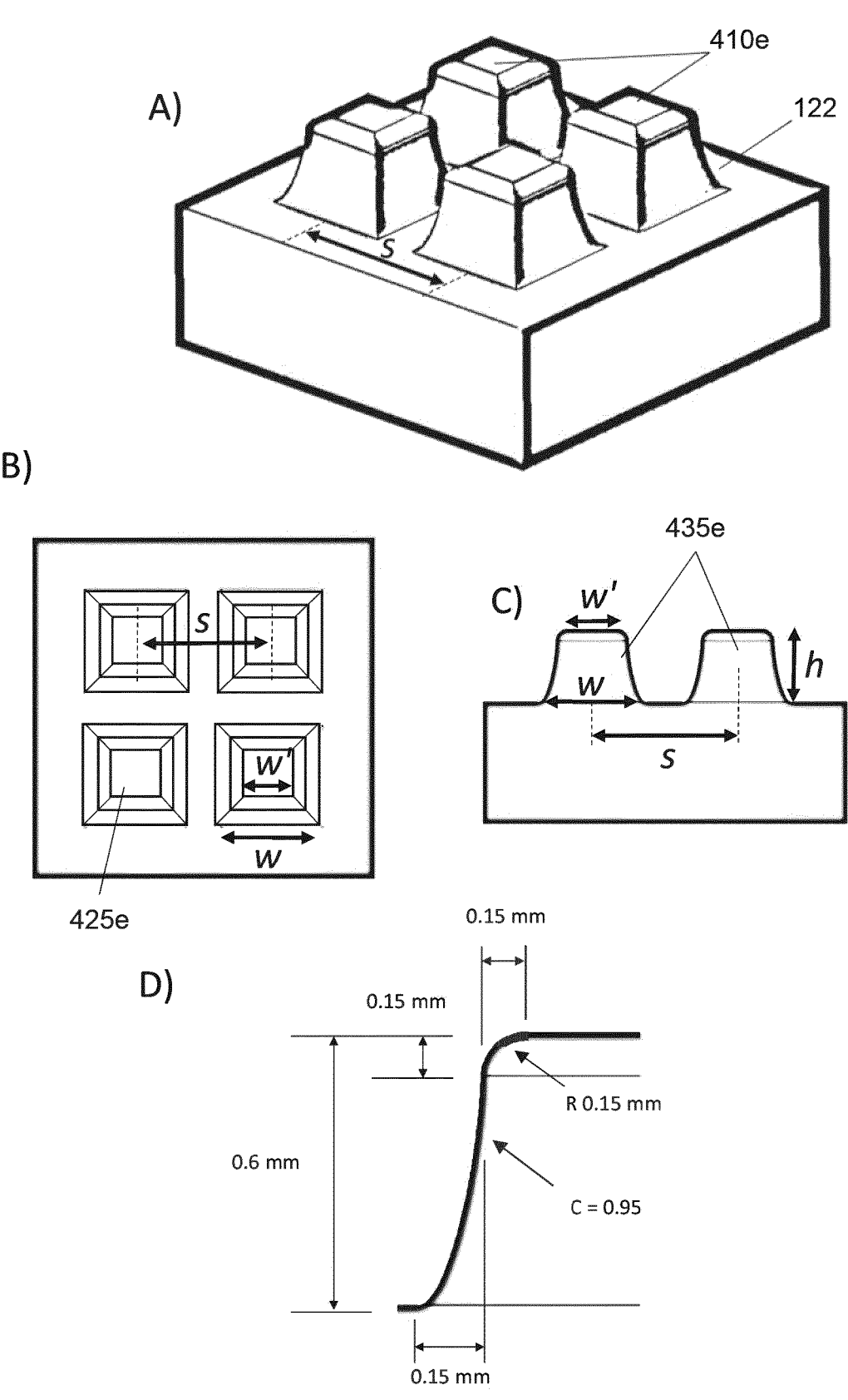

FIG. 18 shows elements 410e on a groove surface 122 which are a combination of the elements shown in FIG. 15 and FIG. 16, e.g. the second cross-sectional 435e shape comprises a truncated hyperbola having a filleted top edge having a radius of curvature of 0.15 mm. The first cross-sectional shape 425e is a square having a width of 0.9 mm such that the width of the top surface (e.g. the square root of the surface area of the element that contacts the water droplets) is 0.3 mm. FIG. 18C shows that the width w at the base of the second cross-sectional shape 435e is greater than a corresponding width w' at the top of the second cross-sectional shape 435e.

FIG. 19A shows elements 410f on a groove surface 122 in accordance with an embodiment of the present invention with a first nearest neighbour spacing s of 1.0 mm. FIG. 19B shows the first cross-sectional shape 425f of the elements 410f in the first cross-sectional plane 420 as being square with a width w of 0.6 mm. FIG. 19C shows the second cross-sectional shape 435f of the elements being a flattened parabola, e.g. a parabola having a flattened top such that the cross-sectional shape has two parallel edges parallel to the groove surface 122 and two convex curved surfaces that extend between the top and sides with a depth of 0.15 mm. FIG. 19C shows that the width w at the base of the second cross-sectional shape 435f is greater than a corresponding width w' at the top of the second cross-sectional shape 435f.

Figure 19:
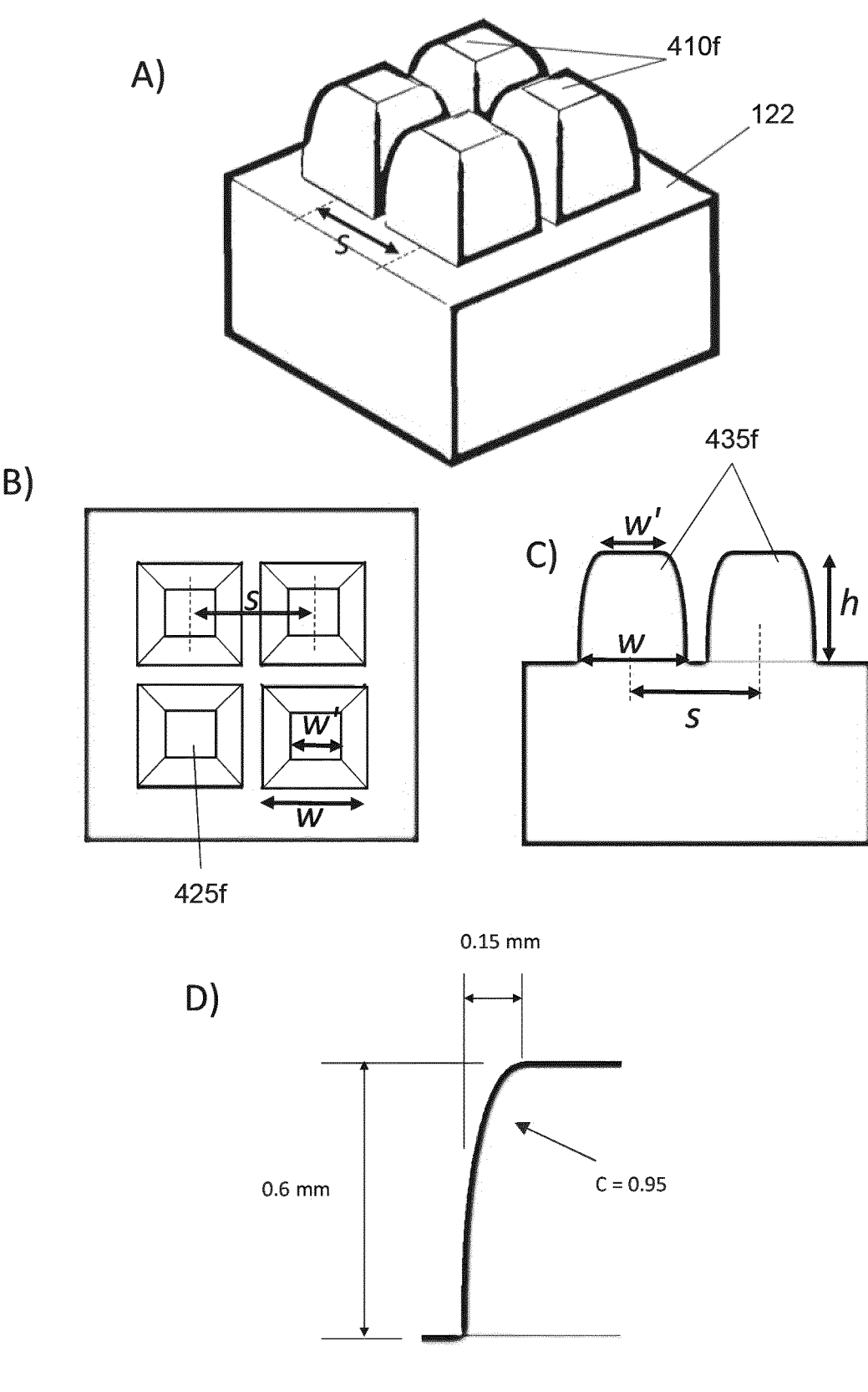
Figure 20:
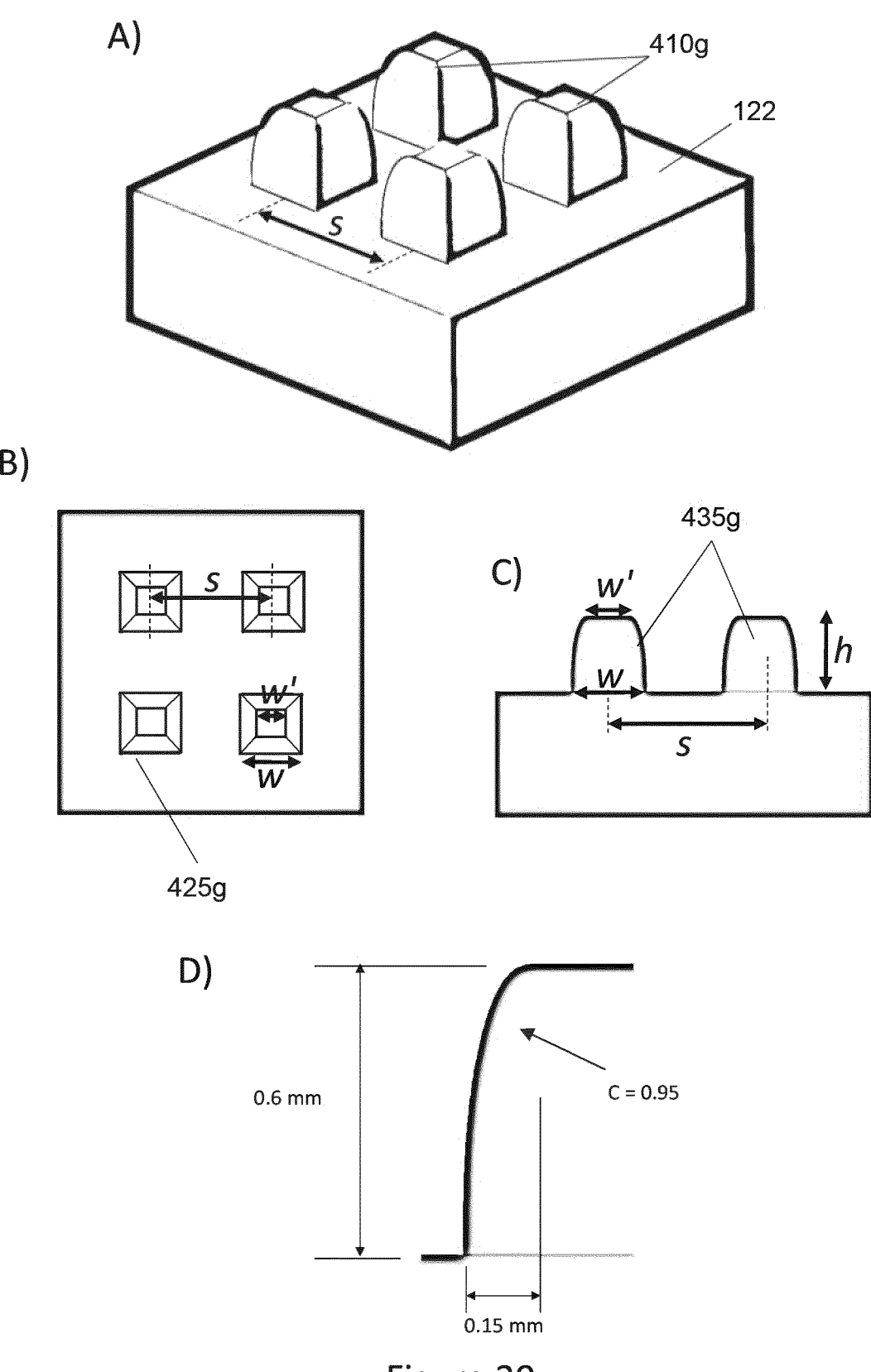

FIG. 20 shows elements 410g identical to that shown in FIG. 19, with the only difference between the two embodiments being that the first nearest neighbour spacing s is 1.2 mm in FIG. 20 (compared to 1.0 mm in FIG. 19). FIG. 20C shows that the width w at the base of the second cross-sectional shape 435g is greater than a corresponding width w' at the top of the second cross-sectional shape 435g.

Figure 21:
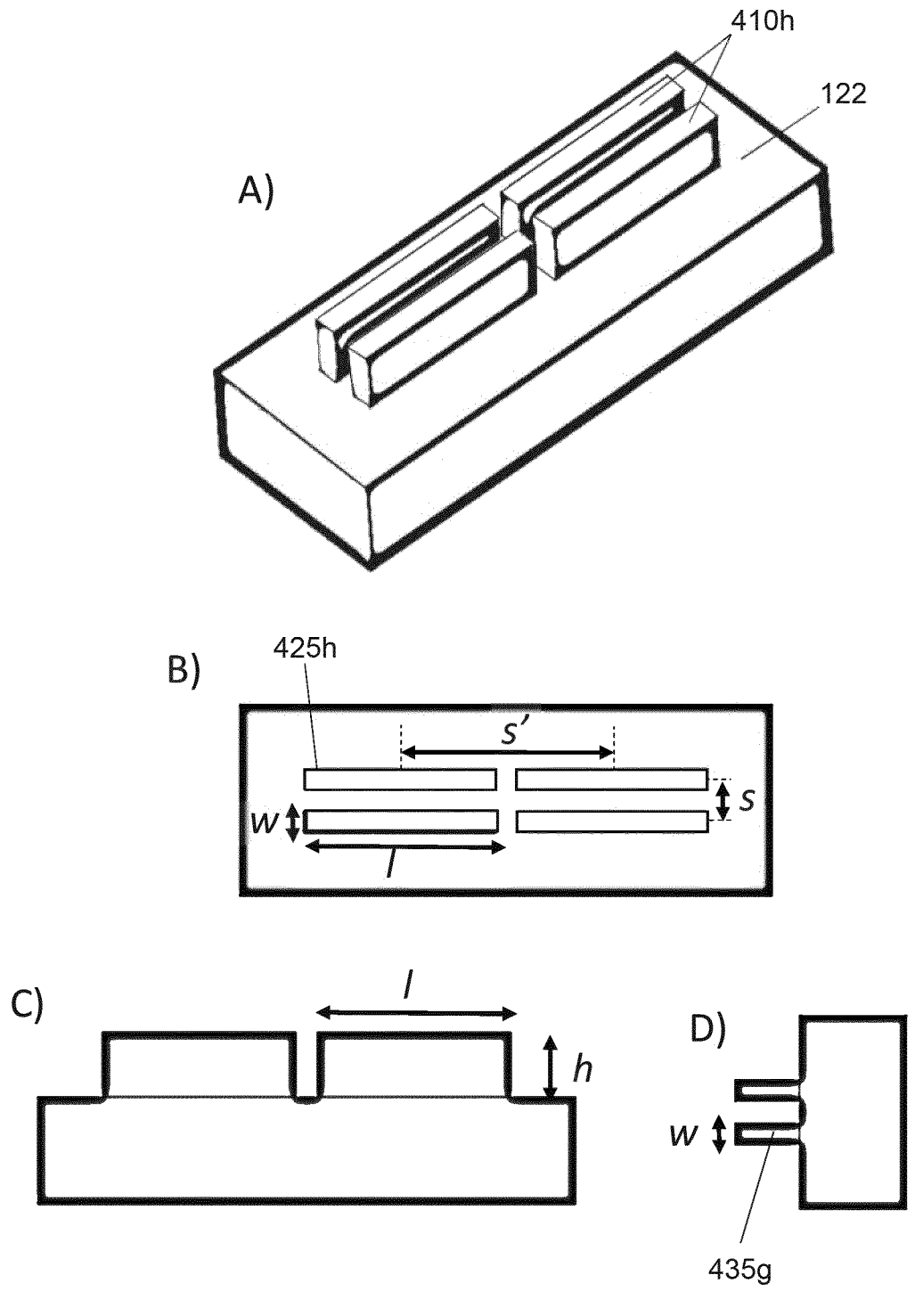

Whereas FIGS. 14-20 exemplify elements having an overall point-like shape, in FIGS. 21-22 there is seen some examples of elongate elements.

FIG. 21 shows elements 410h on a groove surface 122 in accordance with an embodiment of the present invention with a first nearest neighbour spacing s of 0.4 mm and a second nearest neighbour spacing s' of 2 mm (shown in FIG. 21B). FIG. 21B shows the first cross-sectional shape 425h of the elements 410h in the first cross-sectional plane 420h as being a rectangular elongate strip with a width w of 0.2 m and a length/of 1.8 mm. It will be appreciated that the longitudinal axis of the elements may be orientated in any suitable and/or desirable direction, e.g. parallel to the circumferential direction of the tread or perpendicular to it.

FIGS. 21C and 21D show the different second cross-sectional shapes of the elements 410$h$ in both planes perpendicular to the groove surface 122. It will be appreciated that if the elements 410$h$ are orientated with the longitudinal axis parallel to the circumferential direction, FIG. 21D represents the second cross-sectional shape 435$h$. In contrast, if the elements are orientated with the longitudinal axis perpendicular to the circumferential axis, FIG. 21C represents the second cross-sectional shape 435$h$. In FIG. 21D, the second cross-sectional shape is rectangular, with an aspect ratio of about 5. Although not shown, the top of the rectangular shape may be rounded or chamfered as disclosed herein.

FIG. 22 shows elements 410$i$ on a groove surface 122 in accordance with an embodiment of the present invention with a first nearest neighbour spacing s of 0.4 mm and a second nearest neighbour spacing s' of 2 mm. FIG. 22B shows the first cross-sectional shape 425$i$ of the elements 410 in the first cross-sectional plane 420 as being a rectangular elongate strip with a width w of 0.2 m and a length l of 1.8 mm. It will be appreciated that the longitudinal axis of the elements may be orientated in any suitable and/or desirable direction, e.g. parallel to the circumferential direction of the tread or perpendicular to it.

FIG. 22C shows that the second cross-sectional shape of the elements 410$i$ in one of the planes perpendicular to the groove surface 122 is a rectangle. FIGS. 22D and 22E show that the second cross-sectional shape of the elements 410$i$ in the other perpendicular plane to the groove surface 122 is a trapezoid In FIGS. 22D and 22E, the second cross-sectional shape is trapezoidal with an aspect ratio of about 4. Although not shown, the top of the trapezoidal shape may be rounded or chamfered as disclosed herein. FIGS. 22D and 22E also show that the width w at the base of the second cross-sectional shape 435$i$ is greater than a corresponding width w' at the top of the second cross-sectional shape 435$i$.

FIGS. 23 and 24 show two possible orientations of the elements shown in FIGS. 22 and 23 on a groove surface. For example, the extended rectangular elements may be orientated such that the longitudinal axis of the first cross-sectional shape is parallel to the circumference of the tire (FIG. 23). Alternatively the longitudinal axis of the first cross-sectional shape may be orientated to be perpendicular to the circumference of the tire, e.g. extending from groove wall to groove wall and/or extending from the base to the tread surface.

FIG. 25A to G shows the shape in the first cross-section (left), the shape in the second cross-section (centre) and the 3D shape (right) of a plurality of elements in accordance with various embodiments of the present invention. All elements are shown to have a width w defined with respect to the first cross-sectional shape (left) and a height h defined with respect to the second cross-sectional shape (centre). It will thus be appreciated that the width w is defined as the smallest dimension of the first cross-sectional shape and the height h is defined as the greatest extension dimension of the second cross-sectional shape.

Figure 25:
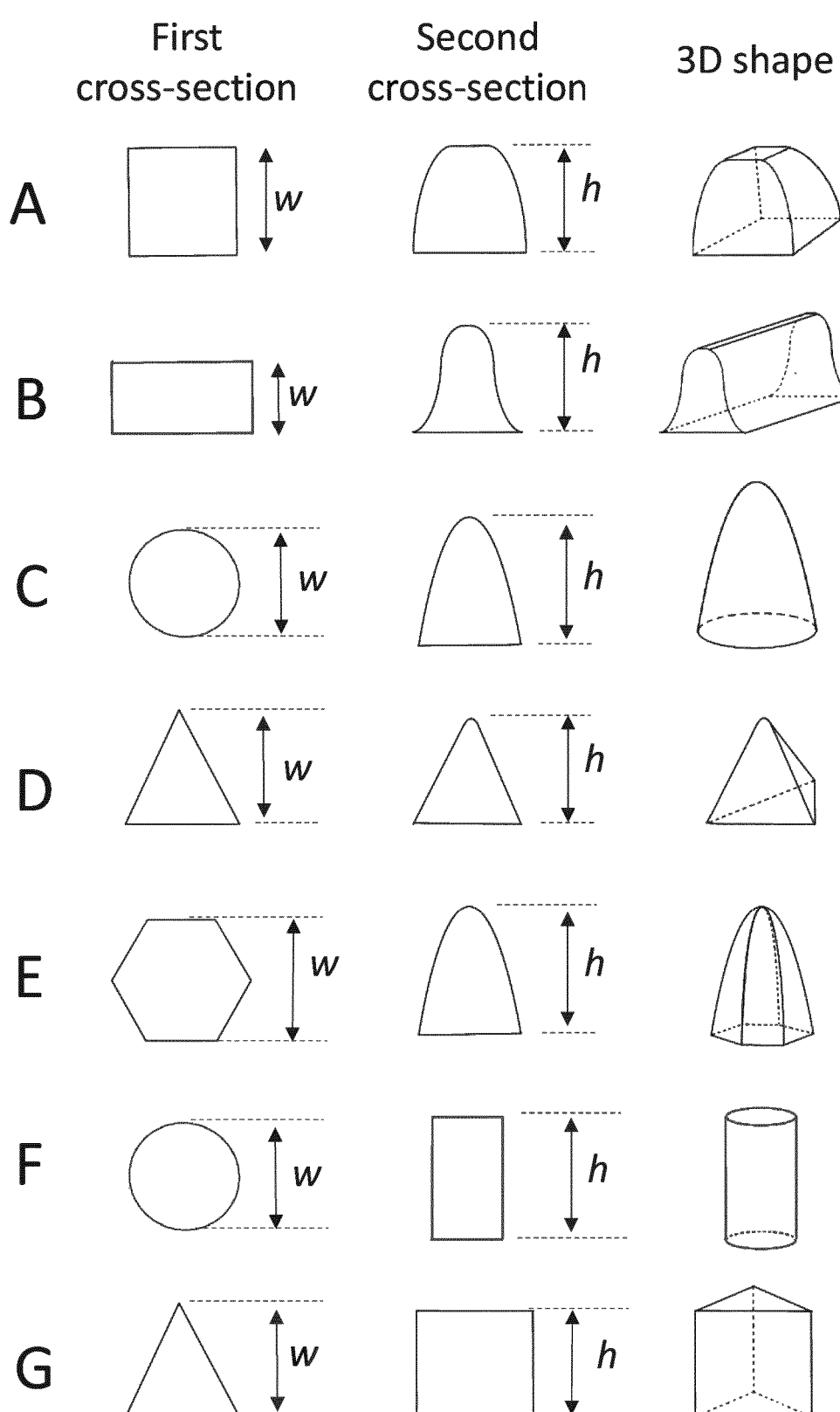

FIG. 25A shows an element having a square first cross-sectional shape and flattened parabolic second cross-sectional shape (e.g. an element similar in shape to the elements shown in FIGS. 19 and 20).

FIG. 25B shows an element having a rectangular first cross-sectional shape and a truncated or flattened Gaussian second cross-sectional shape, e.g. a Gaussian curve with a flat top or two parallel surfaces of differing widths with sinusoidal shaped edges that transition between the two.

FIG. 25C shows an element having a circular first cross-sectional shape and a parabolic (e.g. truncated at the base) second cross-sectional shape, also similar to a rounded cone.

FIG. 25D shows an element having a triangular first cross-sectional shape and a substantially triangular second cross-sectional shape with a rounded top such that the three dimensional shape is a rounded triangular pyramid.

FIG. 25E shows an element having a hexagonal first cross-sectional shape and a parabolic (e.g. truncated at the base) second cross-sectional shape.

FIG. 25F shows an element having a circular first cross-sectional shape and a rectangular second cross-sectional shape such that the three dimensional shape is a cylinder.

FIG. 25G shows an element having a triangular first cross-sectional shape and a rectangular second cross-sectional shape such that the three dimensional element shape is a triangular prism.

The invention claimed is:

1. A tread for a pneumatic tire, the tread comprising:
  a plurality of grooves, the grooves comprising:
    a groove surface; and
    a plurality of elements spaced from one another in an arrangement on the groove surface;
    wherein each element has a shape defining a volume, the shape including:
      a first cross-sectional shape in a plane parallel to the groove surface, wherein a smallest dimension of the first cross-sectional shape defined at the groove surface defines a width w of a base of the element, wherein 0.1 mm≤w≤3 mm;
      a second cross-sectional shape in a plane perpendicular to the groove surface, wherein a greatest dimension of the second cross-sectional shape from a base at the groove surface to a top defines a height h of the element, wherein 0.1 mm≤h≤3 mm, wherein the second cross-sectional shape is generally parabolic or hyperbolic;
      wherein the volume of each element is between 0.2 and 0.6 mm³; and
      an aspect ratio of the height h divided by the width w of at least 1 and up to 30;
    and wherein the arrangement comprises:
      a void volume in the spaces between the elements; and
      a void ratio of from 0.5 to 0.65, wherein the void ratio is defined as a ratio of the void volume to the total volume of the elements in the arrangement.

2. The tread of claim 1, wherein the second cross-sectional shape includes the width w and the height h, wherein the width w at the base of the second cross-sectional shape is greater than a corresponding width w' at the top of the second cross-sectional shape.

3. The tread of claim 1, wherein the first cross-sectional shape has a length l that is greater than the width w.

4. The tread of claim 1, wherein the first cross-sectional shape is an elongate strip defining a length l much greater than the width w.

5. The tread of claim 1, wherein each element has a shape defining a volume that is greater than about 0.1 mm³.

6. The tread of claim 1, wherein the arrangement of the plurality of elements is a regular pattern.

7. The tread of claim 1, wherein the elements are spaced from one another in the arrangement by a typical or average spacing of between 50 μm and 1.5 mm.

8. A tread for a pneumatic tire, the tread comprising a plurality of grooves, the grooves comprising:

a groove surface; and a plurality of elements spaced from one another in an arrangement on the groove surface;

wherein each element has a shape including:

a first cross-sectional shape in a plane parallel to the groove surface, wherein a smallest dimension of the first cross-sectional shape defined at the groove surface defines a width w of a base of the element;

a second cross-sectional shape in a plane perpendicular to the groove surface, wherein a greatest dimension of the second cross-sectional shape from the base at the groove surface to a top defines a height h of the element, wherein the second cross-sectional shape is generally parabolic or hyperbolic;

wherein the second cross-sectional shape includes the width w and the height h, wherein the width w at the base of the second cross-sectional shape is greater than a corresponding width w' at the top of the second cross-sectional shape;

wherein each element has a volume between 0.2 and 0.6 mm$^3$; and wherein the arrangement comprises:

a void volume in the spaces between the elements; and a void ratio of from 0.5 to 0.65, wherein the void ratio is defined as a ratio of the void volume to the total volume of the elements in the arrangement.

9. The tread of claim 8, wherein the first cross-sectional shape has a length I that is greater than the width w.

10. The tread of claim 8, wherein the first cross-sectional shape is an elongate strip defining a length l much greater than the width w.

11. The tread of claim 8, wherein each element has a shape defining a volume that is greater than about 0.1 mm$^3$.

12. The tread of claim 8, wherein the arrangement of the plurality of elements is a regular pattern.

13. The tread of claim 8, wherein the elements are spaced from one another in the arrangement by a typical or average spacing of between 50 μm and 1.5 mm.

\* \* \* \* \*